(12) United States Patent
Aoki

(10) Patent No.: US 10,886,648 B2
(45) Date of Patent: Jan. 5, 2021

(54) COMMUNICATION MODULE, ELECTRONIC DEVICE, AND IMAGE PICKUP APPARATUS

(71) Applicant: CANON KABUSHIKI KAISHA, Tokyo (JP)

(72) Inventor: Makoto Aoki, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/675,536

(22) Filed: Nov. 6, 2019

(65) Prior Publication Data
US 2020/0169018 A1  May 28, 2020

(30) Foreign Application Priority Data

Nov. 26, 2018 (JP) ................................. 2018-220770
Oct. 11, 2019 (JP) ................................. 2019-187665

(51) Int. Cl.
| H01L 35/00 | (2006.01) |
| H01R 12/71 | (2011.01) |
| H01R 13/6461 | (2011.01) |
| H04B 15/02 | (2006.01) |
| H04N 5/225 | (2006.01) |
| H01R 24/40 | (2011.01) |
| H01R 103/00 | (2006.01) |

(52) U.S. Cl.
CPC ....... H01R 12/716 (2013.01); H01R 13/6461 (2013.01); H01R 24/40 (2013.01); H04B 15/02 (2013.01); H04N 5/2252 (2013.01); H01R 2103/00 (2013.01)

(58) Field of Classification Search
CPC .............. H01Q 3/44; H01Q 1/38; H01Q 13/10
USPC ............................... 343/700 R, 770 MS, 767
See application file for complete search history.

(56) References Cited

U.S. PATENT DOCUMENTS 7,114,958 B2 * 10/2006 Angelucci ............ H01Q 1/1207
439/65
7,327,040 B2 * 2/2008 Aoki .................... G11B 25/043
257/778

(Continued)

OTHER PUBLICATIONS

"Controlling Radiated Emissions by Design", by Mitsutoshi Hatori, published by Maruzen on Jun. 30, 2000. p. 238 (English Abstract included).

*Primary Examiner* — Phuong Chi Thi Nguyen
(74) *Attorney, Agent, or Firm* — Venable LLP

(57) ABSTRACT

A communication module includes a wiring board including ground wiring, an electronic component provided on the wiring board, and a first connector provided on the wiring board and electrically connected to the electronic component via the wiring board. The first connector includes a metal member electrically connected to the ground wiring, and a plurality of pins arranged in an arrangement direction and including a plurality of high-frequency signal pins used for transmission of a high-frequency signal and a plurality of non-high-frequency signal pins for a use different from the transmission of the high-frequency signal. The plurality of high-frequency signal pins include a plurality of first pins successively arranged in the arrangement direction. None of the plurality of non-high-frequency signal pins is interposed between the plurality of first pins and the metal member.

19 Claims, 13 Drawing Sheets

(56) References Cited

U.S. PATENT DOCUMENTS

| | | | |
|---|---|---|---|
| 7,491,086 B2 * | 2/2009 | Aoki | .................. H01R 12/79 |
| | | | 439/541.5 |
| 10,069,190 B2 | 9/2018 | Aoki | |
| 10,250,286 B2 | 4/2019 | Aoki | |
| 10,516,200 B2 | 12/2019 | Aoki | |
| 2018/0006378 A1 | 1/2018 | Abe | |
| 2020/0169018 A1 * | 5/2020 | Aoki | ................ H04N 5/2252 |

* cited by examiner

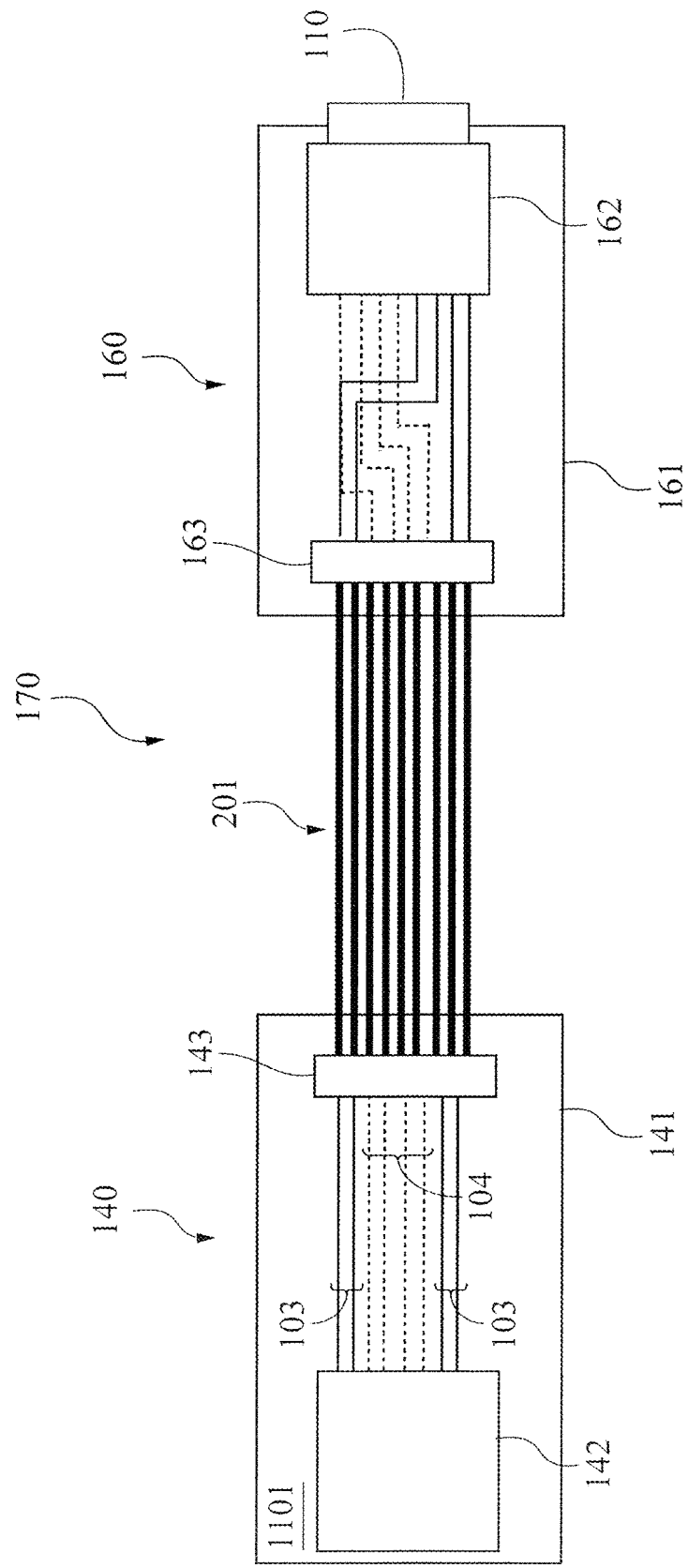

COMMUNICATION MODULE, ELECTRONIC DEVICE, AND IMAGE PICKUP APPARATUS

BACKGROUND OF THE INVENTION

Field of the Invention

The present invention relates to addressing noises.

Description of the Related Art

There is an electronic device including a wireless communication unit. As a result of a digital camera serving as an example of an electronic device of this kind including the wireless communication unit, an image capturing operation or the like can be remotely controlled by another device such as a personal computer: PC, or a captured image can be transmitted to another device.

There has been a problem that, in the electronic device of this kind, an electromagnetic noise radiated from a cable disposed therein is received by the wireless communication unit and thus the wireless communication speed is lowered.

As one method of solving this problem of lowering the reliability of wireless communication, page 238 of "Controlling Radiated Emissions by Design" supervised by Mitsutoshi HATORI and published by Maruzen on Jun. 30, 2000 discloses a method of reducing the electromagnetic noise radiated from the cable by a ring-shaped ferrite core by inserting the cable in the ferrite core.

However, due to miniaturization of the electronic device and increase in the sensitivity of the wireless communication unit receiving an electromagnetic wave, noise reduction of a conventional method is insufficient, and further improvement has been desired. In addition, since there is a case where, even if the electronic device does not include a wireless communication unit, another electronic device that performs wireless communication is disposed around the electronic device, it has been desired that the amount of radiation of noise is reduced such that the noise does not interfere with the other electronic device.

SUMMARY OF THE INVENTION

According to one aspect of the present invention, a communication module includes a wiring board including ground wiring, an electronic component provided on the wiring board, and a first connector provided on the wiring board and electrically connected to the electronic component via the wiring board. The first connector includes a metal member electrically connected to the ground wiring, and a plurality of pins arranged in an arrangement direction and including a plurality of high-frequency signal pins used for transmission of a high-frequency signal and a plurality of non-high-frequency signal pins for a use different from the transmission of the high-frequency signal. The plurality of high-frequency signal pins include a plurality of first pins successively arranged in the arrangement direction. None of the plurality of non-high-frequency signal pins is interposed between the plurality of first pins and the metal member.

Further features of the present invention will become apparent from the following description of exemplary embodiments with reference to the attached drawings.

BRIEF DESCRIPTION OF THE DRAWINGS

FIG. 8 is a plan view of a communication module according to a second modification example.

DESCRIPTION OF THE EMBODIMENTS

First Exemplary Embodiment

Figure 1A:
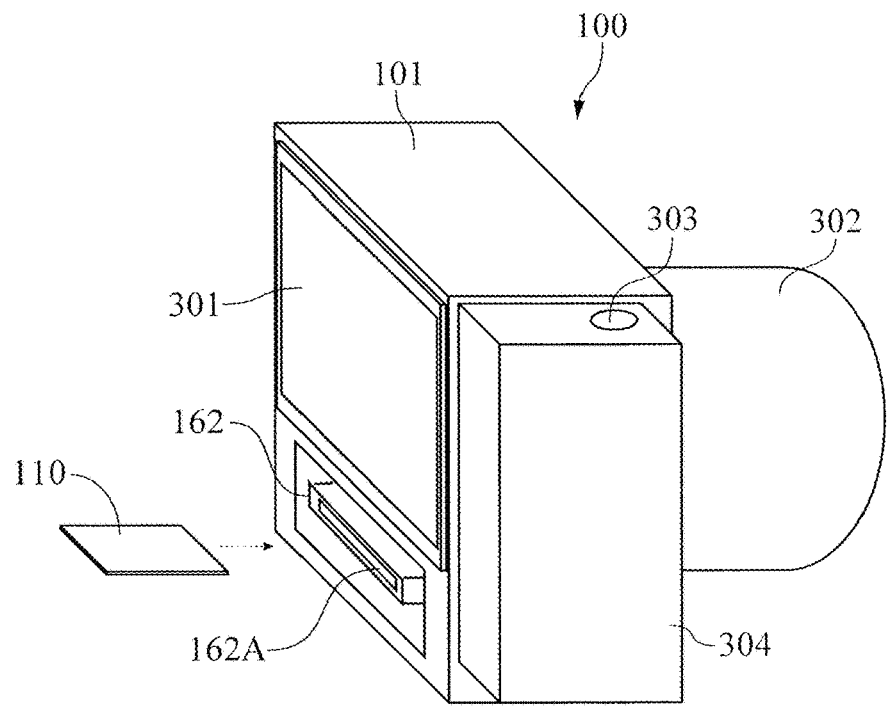
FIG. 1A is a perspective view of an image pickup apparatus serving as an example of an electronic device according to a first exemplary embodiment.
Figure 1B:
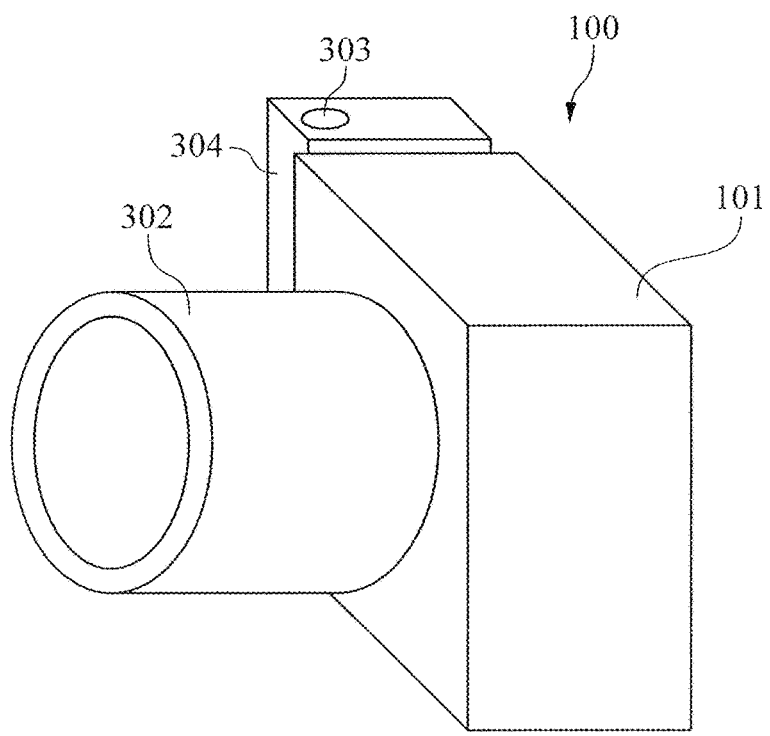
FIG. 1B is another perspective view of the image pickup apparatus serving as an example of an electronic device according to the first exemplary embodiment.

FIGS. 1A and 1B are perspective views of an image pickup apparatus 100 serving as an example of an electronic device according to a first exemplary embodiment. FIG. 1A is a perspective view of the image pickup apparatus 100 as viewed from the side on which a liquid crystal display 301 is provided. FIG. 1B is a perspective view of the image pickup apparatus 100 as viewed from the side on which a lens barrel 302 is provided. The image pickup apparatus 100 is a digital camera, and has a function of capturing a still image and/or a moving image. The image pickup apparatus 100 includes a casing 101 that is an exterior case, the liquid crystal display 301 provided in the casing 101, and a grip 304 provided on the casing 101. A shutter button 303 is provided in the grip 304. The lens barrel 302 is attachable to and detachable from the casing 101.

A memory connector 162 including a slot 162A is disposed inside the casing 101. A memory card 110 that is a memory such as a secure digital: SD card or a compact flash: CF card is attachable to and detachable from the slot 162A of the memory connector 162. By detaching an unillustrated lid from the casing 101, the slot 162A of the memory connector 162 is exposed to the outside of the casing 101. By inserting the memory card 110 in the slot 162A, image data obtained by image capturing can be written into the memory card 110, and the image data written into the memory card 110 can be read out.

Figure 2A:
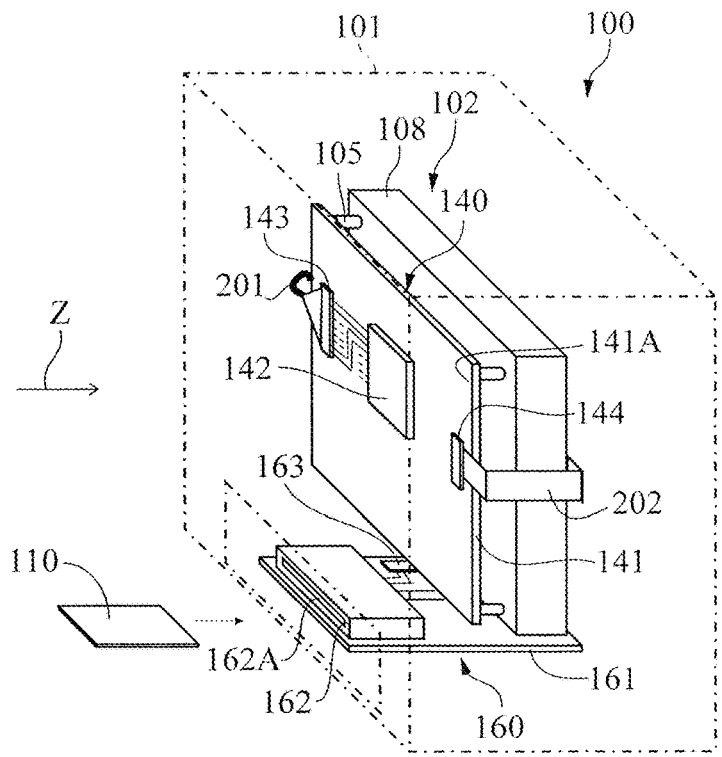
FIG. 2A is a perspective view of a wireless communication device according to the first exemplary embodiment.
Figure 2B:
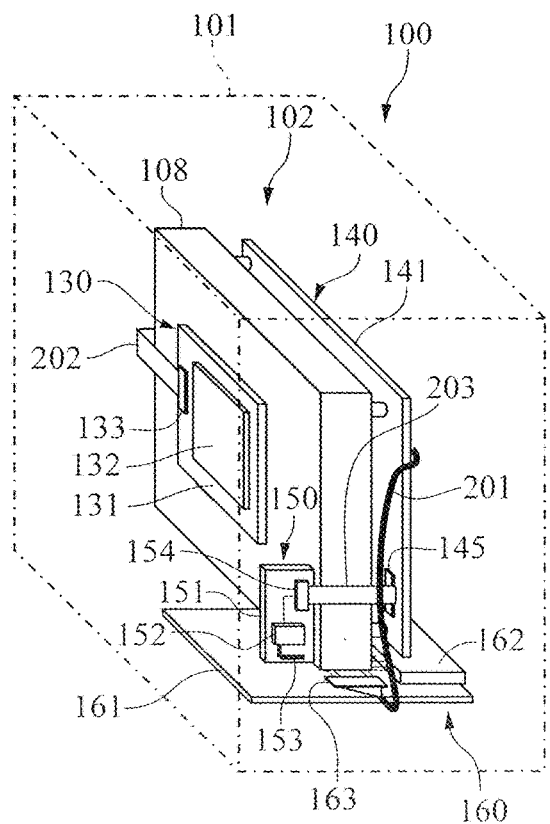
FIG. 2B is another perspective view of the wireless communication device according to the first exemplary embodiment.
Figure 3A:
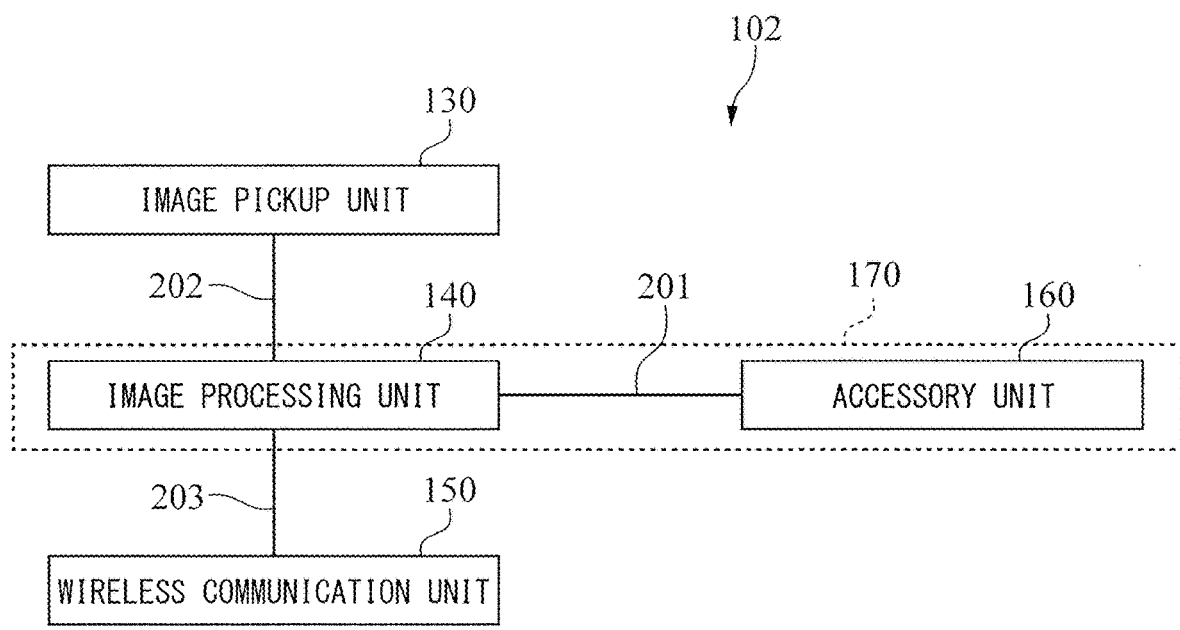
FIG. 3A is a block diagram of the wireless communication device according to the first exemplary embodiment.
Figure 3B:
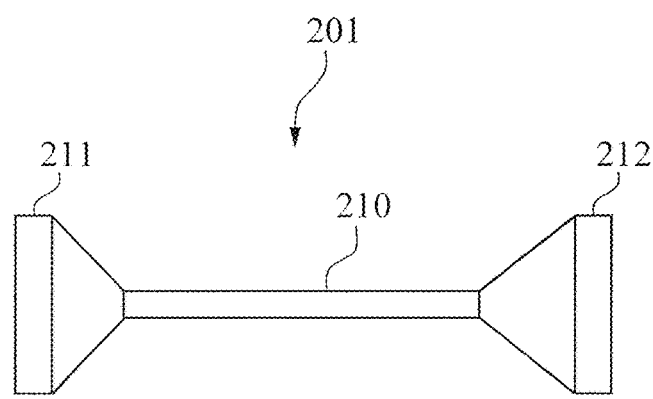
FIG. 3B is an explanatory diagram of a harness according to the first exemplary embodiment.

FIGS. 2A and 2B are perspective views of a wireless communication device disposed inside the casing of the image pickup apparatus according to the first exemplary embodiment. FIG. 3A is a block diagram of the wireless communication device according to the first exemplary embodiment. FIG. 3B is an explanatory diagram of a harness. The image pickup apparatus 100 includes the casing 101 and a wireless communication device 102 disposed inside the casing 101. FIG. 2A is a perspective view of the wireless communication device 102 as viewed in the same direction as in FIG. 1A, and FIG. 2B is a perspective view of the wireless communication device 102 as viewed in the same direction as in FIG. 1B.

The wireless communication device 102 includes an image pickup unit 130, an image processing unit 140, a wireless communication unit 150, and an accessory unit 160. The image processing unit 140 is communicably connected to the image pickup unit 130, the wireless communication unit 150, and the accessory unit 160. The image processing unit 140 and the accessory unit 160 are communicably interconnected via a harness 201 including a plurality of lines. The image processing unit 140 and the image pickup unit 130 are communicably interconnected via a harness 202 including a plurality of lines. The image processing unit 140 and the wireless communication unit 150 are communicably interconnected via a harness 203 including a plurality of lines.

A support member 108 formed from resin or metal is disposed inside the casing 101, and the image pickup unit 130, the image processing unit 140, the wireless communication unit 150, and the accessory unit 160 are supported by the support member 108. The image pickup unit 130 is disposed on the lens barrel 302 side illustrated in FIG. 1B with respect to the support member 108. The image processing unit 140 is fixed to the support member 108 by fixing members 105 such as screws.

The image pickup unit 130 includes a wiring board 131, an image pickup element 132 that is a semiconductor device mounted on the wiring board 131, and a connector 133 mounted on the wiring board 131. The wiring board 131 is a printed wiring board. The image pickup element 132 is an image sensor such as a complementary metal oxide semiconductor: CMOS image sensor or a charge coupled device: CCD image sensor. The image pickup element 132 photoelectrically converts an incident optical image and outputs a data signal that is a digital signal representing a captured image. The connector 133 is electrically connected to the image pickup element 132 via wiring of the wiring board 131.

The wireless communication unit 150 performs wireless communication in a GHz band. The wireless communication unit 150 is a wireless communication module. The wireless communication unit 150 includes a wiring board 151 on which an antenna 153 is provided, and a wireless communication integrated circuit: wireless communication IC 152 mounted on the wiring board 151. The wiring board 151 is a printed wiring board. In addition, the wireless communication unit 150 includes a connector 154 mounted on the wiring board 151 and electrically connected to the wireless communication IC 152 via wiring of the wiring board 151. The wireless communication IC 152 performs wireless communication with an external device such as a PC or a wireless router via the antenna 153, and thus transmits and receives image data. That is, the wireless communication IC 152 modulates the digital signal representing image data and transmits the modulated signal as an electromagnetic wave of a communication frequency conforming to a wireless communication standard via the antenna 153. In addition, the wireless communication IC 152 demodulates an electromagnetic wave received by the antenna 153 into a digital signal representing image data. The wireless communication IC 152 wirelessly communicates with an external apparatus in accordance with, for example, the standard of WiFi (registered trademark). To be noted, although a case where the wireless communication unit 150, that is, the wireless communication IC 152 performs wireless communication in accordance with the standard of WiFi (registered trademark) will be described in the first exemplary embodiment, the wireless communication standard is not limited to this. For example, the wireless communication standard may be the standard of Bluetooth (registered trademark).

The image processing unit 140 incudes a wiring board 141 and an image processing IC 142 mounted on the wiring board 141. The wiring board 141 is a printed wiring board. In addition, the image processing unit 140 includes connectors 143, 144, and 145 mounted on the wiring board 141 and electrically connected to the image processing IC 142 via wiring of the wiring board 141.

The accessory unit 160 includes a wiring board 161 and the memory connector 162 mounted on the wiring board 161. The wiring board 161 is a printed wiring board. In addition, the accessory unit 160 includes a connector 163 mounted on the wiring board 161 and electrically connected to the memory connector 162 via wiring of the wiring board 161.

A first end of the harness 201 is attached to the connector 143 of the image processing unit 140, and a second end of the harness 201 is attached to the connector 163 of the accessory unit 160. A first end of the harness 202 is attached to the connector 144 of the image processing unit 140, and a second end of the harness 202 is attached to the connector 133 of the image pickup unit 130. A first end of the harness 203 is attached to the connector 145 of the image processing unit 140, and a second end of the harness 203 is attached to the connector 154 of the wireless communication unit 150.

The data signal communicated between the image processing unit 140 and the accessory unit 160 via the harness 201 is a high-frequency signal, for example, a digital signal of a communication speed of 100 Mbps or higher. This data signal is a digital signal of image data in the first exemplary embodiment. This data signal may be a single-ended signal or a differential signal, and is a differential signal that can be transmitted at a higher speed than a single-ended signal in the first exemplary embodiment.

The image processing IC 142 and the memory card 110 perform communication in accordance with the standard of PCI Express (registered trademark), more specifically the standard of PCI Express (registered trademark) 2.0. That is, interfaces in a communication network between the image processing IC 142 and the memory card 110 conform to the standard of PCI Express (registered trademark) 2.0. To be noted, although a case where the communication system between the image processing IC 142 and the memory card 110 is PCI Express (registered trademark) 2.0 has been described, the configuration is not limited to this. For example, a communication system of a different standard such as Serial ATA, universal serial bus: USB, or high-definition multimedia interface: HDMI (registered trademark) or a communication system of a different transmission speed may be employed.

The image processing IC 142 is capable of obtaining a digital signal that is an electric signal representing a captured image from the image pickup element 132 and performing image processing to generate image data. In addition, the image processing IC 142 is capable of performing processing of writing image data into the memory card 110 and reading image data out of the memory card 110. Further, the image processing IC 142 is capable of performing processing of obtaining image data from the wireless communication IC 152 and processing of transmitting image data to the wireless communication IC 152.

In the first exemplary embodiment, the communication module 170 is constituted by the image processing unit 140, the accessory unit 160, and the harness 201 as illustrated in FIG. 3A. The image processing IC 142 of the image processing unit 140 illustrated in FIGS. 2A and 2B is a semiconductor device serving as an example of an electronic component. The memory connector 162 of the accessory unit 160 serves as an example of an electronic component. The harness 201 includes a data signal line, that is, a transmission path of a data signal that is a digital signal representing image data. Further, the harness 201 includes lines other than the data signal line, for example, a control line, a power supply line, and a ground line that are different from a transmission path of a data signal. To be noted, a different signal may be added to the data signal that is transmitted to the transmission path that is a data signal line. For example, the different signal is a synchronization signal.

A shielded cable is used for the harness 201 to prevent radiation of electromagnetic noise or prevent an electromagnetic noise from the outside from being superimposed on the digital signal when transmitting a digital signal by using the harness 201. As illustrated in FIG. 3B, the harness 201 includes a cable portion 210, a connector 211 provided at a first end of the cable portion 210 in a longitudinal direction, and a connector 212 provided at a second end of the cable portion 210 in the longitudinal direction.

The connector 211 of the harness 201 illustrated in FIG. 3B is attachable to and detachable from the connector 143 of the image processing unit 140 illustrated in FIG. 2A. The connector 212 of the harness 201 illustrated in FIG. 3B is attachable to and detachable from the connector 163 of the accessory unit 160 illustrated in FIG. 2B. The connector structure of the accessory unit 160 is the same as the connector structure of the image processing unit 140. The connector structure of the image processing unit 140 will be described below, and description of the connector structure of the accessory unit 160 will be omitted.

Figure 4A:
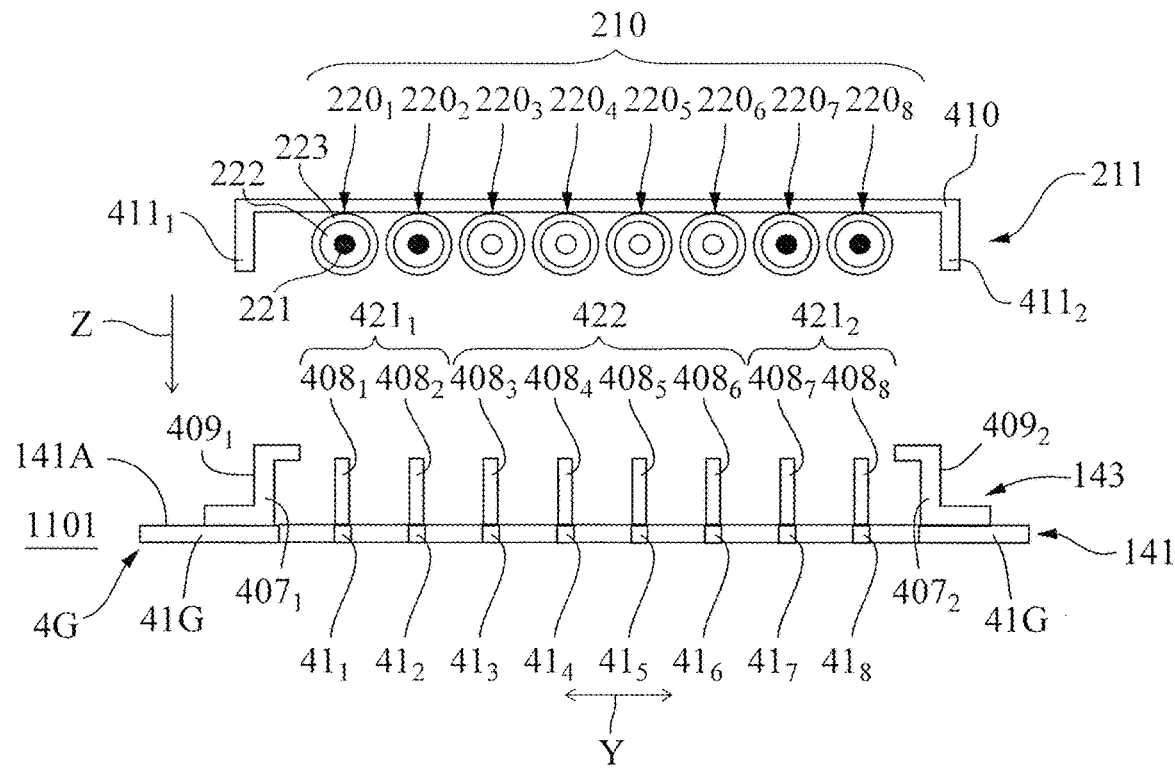
FIG. 4A is a section view of a connection structure of a connector of the harness and a connector of an image processing unit according to the first exemplary embodiment.
Figure 4B:
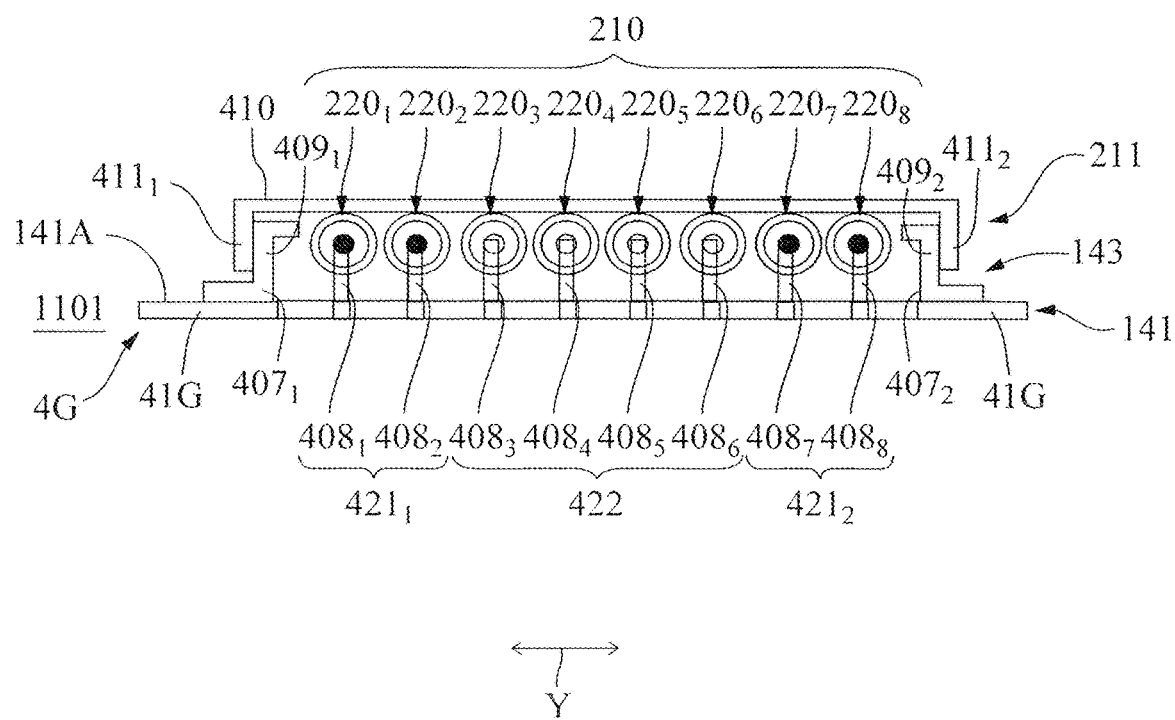
FIG. 4B is another section view of the connection structure of the connector of the harness and the connector of the image processing unit according to the first exemplary embodiment.

FIGS. 4A and 4B are section views of a connection structure of the connector 211 of the harness 201 and the connector 143 of the image processing unit 140 according to the first exemplary embodiment illustrating. FIG. 4A is a section view in a state in which the connector 211 is detached from the connector 143. FIG. 4B is a section view in a state in which the connector 211 is attached to the connector 143. The connector 143 serving as a first connector is provided on the wiring board 141. The harness 201 includes the connector 211 serving as a second connector and provided at an end of the cable portion 210 in the longitudinal direction.

The connector 143 includes a plurality of pins, for example, eight pins $408_1$, $408_2$, $408_3$, $408_4$, $408_5$, $408_6$, $408_7$, and $408_8$ arranged in one line in a Y direction, which is an arrangement direction. In addition, the connector 143 includes a ground terminal $407_1$ serving as an example of a metal member disposed adjacent to the pin $408_1$ in the Y direction and a ground terminal $407_2$ serving as an example of a metal member disposed adjacent to the pin $408_8$ in the Y direction. That is, the eight pins $408_1$ to $408_8$ are disposed between the ground terminals $407_1$ and $407_2$. In the first exemplary embodiment, the ground terminal $407_1$ serves as an example of a first metal member, and the ground terminal $407_2$ serves as an example of a second metal member.

The wiring board 141 includes ground wiring 4G. A plurality of conductor patterns, for example, eight conductor patterns $41_1$, $41_2$, $41_3$, $41_4$, $41_5$, $41_6$, $41_7$, and $41_8$ and a ground pattern 41G which is a conductor pattern that is a part of the ground wiring 4G are formed on a main surface 141A of the wiring board 141. That is, the conductor patterns $41_1$ to $41_8$ and the ground pattern 41G are disposed in a first conductor layer of the wiring board 141. The first conductor layer is a first surface layer 1101 among the first surface layer 1101 and a second surface layer opposite to the first surface layer 1101.

The pins $408_1$ to $408_8$ of the connector 143 are respectively bonded to the conductor patterns $41_1$ to $41_8$ of the wiring board 141 by solder or the like. As a result of this, the pins $408_1$ to $408_8$ of the connector 143 are electrically connected to the conductor patterns $41_1$ to $41_8$. The ground terminals $407_1$ and $407_2$ of the connector 143 are both bonded to the ground pattern 41G of the wiring board 141 by solder or the like. As a result of this, the ground terminals $407_1$ and $407_2$ are both electrically connected to the ground pattern 41G of the wiring board 141. The pins $408_1$ to $408_8$ and the ground terminals $407_1$ and $407_2$ are supported by an unillustrated insulating member. The ground terminals $407_1$ and $407_2$ are disposed to erect on the ground pattern 41G of the wiring board 141 such that a metal case 410 that will be described later can be attached. The ground terminal $407_1$ includes an engagement portion $409_1$, and the ground terminal $407_2$ includes an engagement portion $409_2$.

The cable portion 210 includes a plurality of coaxial cables, for example, eight coaxial cables $220_1$, $220_2$, $220_3$, $220_4$, $220_5$, $220_6$, $220_7$, and $220_8$. The coaxial cables $220_1$ to $220_8$ are shielded cables, and each include a core wire 221, an insulating layer 222 covering the core wire 221, and an outer conductor 223 that is a metal shield covering the insulating layer 222. The outer conductor 223 is a conductor for shielding a noise radiated from the core wire 221 and a noise coming from the outside.

The connector 211 includes a metal case 410 serving as an example of a fourth metal member. The coaxial cables 220 are supported by an unillustrated insulating member attached to the metal case 410. The metal case 410 is formed to have a U-shape in section view. The outer conductors 223 of the eight coaxial cables are in contact with or bonded to the metal case 410, and are thus collectively electrically connected to the metal case 410. The metal case 410 includes two engagement portions $411_1$ and $411_2$ that are end portions in the Y direction. The engagement portion $411_1$ of the metal case 410 engages with, that is, comes into contact with the engagement portion $409_1$ of the ground terminal $407_1$, the engagement portion $411_2$ of the metal case 410 engages with, that is, comes into contact with the engagement portion $409_2$ of the ground terminal $407_2$, and thus the connector 211 is attached to the connector 143. That is, by attaching the connector 211 to the connector 143, the metal case 410 is electrically connected to the ground terminals $407_1$ and $407_2$.

Figure 5:
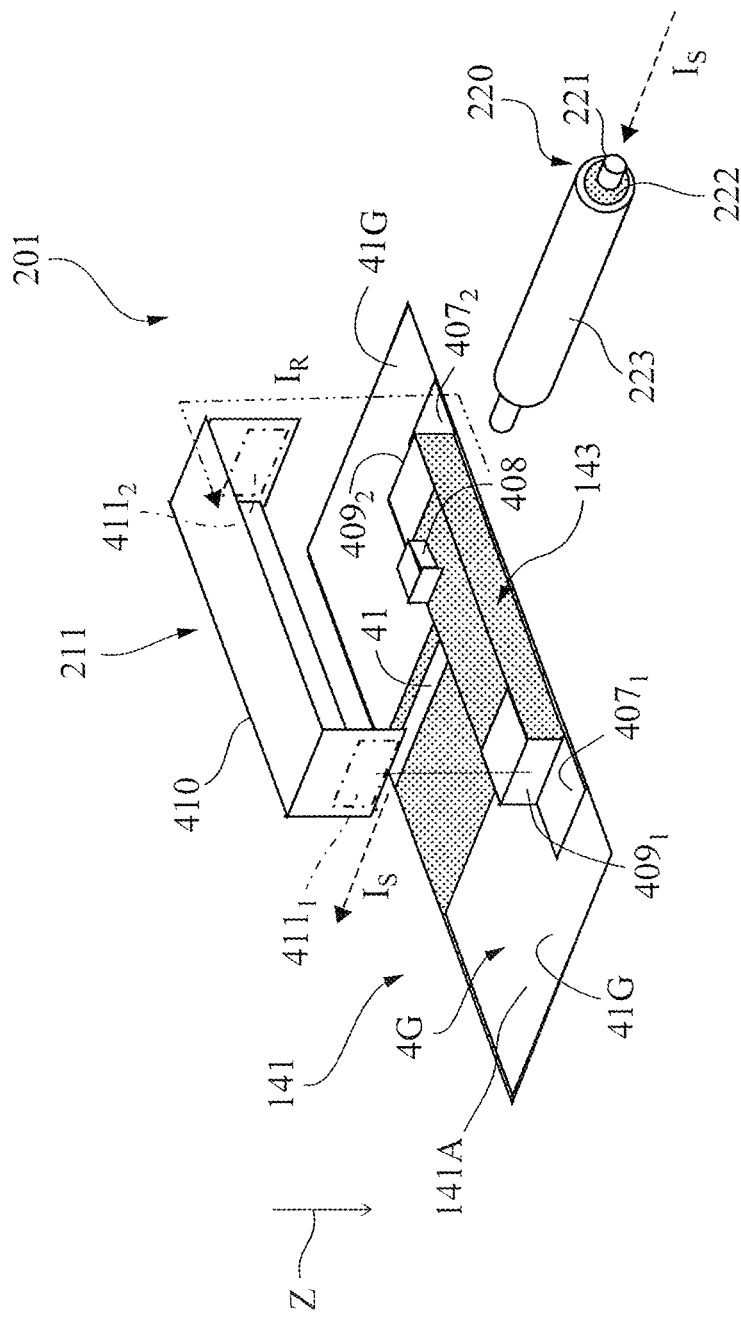
FIG. 5 is an explanatory diagram of a structure of a connector according to the first exemplary embodiment.

FIG. 5 is an explanatory diagram of the structure of the connector 211 of the harness 201 and the connector 143 of the image processing unit 140 according to the first exemplary embodiment. FIG. 5 illustrates the harness 201 in an exploded view. A portion shaded in FIG. 5 is formed from resin. For the sake of convenience, FIG. 5 only illustrates one coaxial cable 220 serving as a transmission path of a data signal among the eight coaxial cables $220_1$ to $220_8$. In addition, for the sake of convenience, FIG. 5 only illustrates one pin 408 serving as a transmission path of a data signal among the eight pins $408_1$ to $408_8$. Further, for the sake of convenience, FIG. 5 only illustrates one conductor pattern 41 serving as a transmission path of a data signal among the eight conductor patterns $41_1$ to $41_8$.

When attaching the connector 211 to the connector 143, the connector 211 is opposed to the connector 143 and moved in a Z direction perpendicular to the main surface 141A as illustrated in FIG. 5. As a result of this, the pin 408 comes into contact with and is thus electrically connected to the core wire 221, and a transmission path of the data signal including the conductor pattern 41 of the wiring board 141, the pin 408, and the core wire 221 of the harness 201 is formed. By attaching the connector 211 to the connector 143, the engagement portion $411_1$ of the metal case 410 engages with, that is, comes into contact with the engagement portion $409_1$ of the connector 143, and the engagement portion $411_2$ of the metal case 410 engages with, that is, comes into contact with the engagement portion $409_2$ of the connector 143. As a result of this, the metal case 410 is electrically connected to the ground pattern 41G of the wiring board 141.

As illustrated in FIG. 5, a signal current $I_S$ passes through the core wire 221 in a direction indicated by a chain line, then flows to the pin 408 from the core wire 221 in the connectors 143 and 211, and flows to the conductor pattern 41 from the pin 408. In contrast, a return current $I_R$ of the signal flows in an opposite direction to the signal current $I_S$ along the outer conductor 223 by taking a roundabout route from the ground pattern 41G through the ground terminal $407_1$ or $407_2$ and the metal case 410 as indicated by a two-dot chain line. Therefore, the path of the return current $I_R$ is longer than the path of the signal current $I_S$ because the return current $I_R$ takes a roundabout route at a connection portion of the connectors 211 and 143. When there is a difference in the length between the path of the signal current $I_S$ and the path of the return current $I_R$, a phase difference is generated between the signal current $I_S$ and the return current $I_R$. The amount of electromagnetic noise to be radiated is larger when the phase difference is larger.

When transmitting a data signal at a high speed through a harness, the radiated electromagnetic noise sometimes belongs to the same band as the wireless communication frequency. In this case, if the electromagnetic noise is received by the wireless communication IC 152 via the antenna 153 illustrated in FIG. 2B, the wireless communication speed decreases more when the level of the received noise is higher. Particularly, in the case where a part of the harness 201 is disposed near one side surface of the casing 101 as illustrated in FIG. 2B, since the harness 201 serving as a noise source and the wireless communication unit 150 serving as a victim circuit are close, the wireless communication IC 152 is likely to be affected by the electromagnetic noise.

In the first exemplary embodiment, the cable portion 210 illustrated in FIGS. 4A and 4B includes four coaxial cables serving as transmission paths of a data signal and four other coaxial cables. That is, the connector 143 includes four pins serving as transmission paths of a data signal and four other pins.

The pins $408_1$ and $408_2$ are disposed adjacent to each other. The pins $408_1$ and $408_2$ are each a first pin serving as a transmission path of the data signal that is a differential signal. The pins $408_1$ and $408_2$ successively arranged in the Y direction constitute a pin group $421_1$. The pins $408_7$ and $408_8$ are disposed adjacent to each other. The pins $408_7$ and $408_8$ are each a second pin serving as a transmission path of the data signal that is a differential signal. The pins $408_7$ and $408_8$ successively arranged in the Y direction constitute a pin group $421_2$. The plurality of pins $408_1$, $408_2$, $408_7$, and $408_8$ are a plurality of high-frequency signal pins used for transmission of a high-frequency signal. The pins $408_3$, $408_4$, $408_5$, and $408_6$ are disposed adjacent to each other. The pins $408_3$ to $408_6$ are each a non-high-frequency signal pin used for a use different from transmission of the high-frequency signal, that is, a path different from the transmission path of the data signal. The pins $408_3$ to $408_6$ successively arranged in the Y direction constitute a pin group 422.

The conductor pattern $41_1$ electrically connected to the pin $408_1$ is a data signal line serving as a transmission path of a data signal. The conductor pattern $41_2$ electrically connected to the pin $408_2$ is a data signal line. The conductor pattern $41_3$ electrically connected to the pin $408_3$ is a line different from a data signal line. The conductor pattern $41_4$ electrically connected to the pin $408_4$ is a line different from a data signal line. The conductor pattern $41_5$ electrically connected to the pin $408_5$ is a line different from a data signal line. The conductor pattern $41_6$ electrically connected to the pin $408_6$ is a line different from a data signal line. The conductor pattern $41_7$ electrically connected to the pin $408_7$ is a data signal line. The conductor pattern $41_8$ electrically connected to the pin $408_8$ is a data signal line.

The ground terminal $407_1$ is closer to the pin group $421_1$ than to the pin group 422. The ground terminal $407_2$ is closer to the pin group $421_2$ than to the pin group 422. That is, the pin group $421_1$ is disposed in the vicinity of the ground terminal $407_1$, and the pin group $421_2$ is disposed in the vicinity of the ground terminal $407_2$. As a result of this, the path difference, that is, phase difference between signal currents passing through the pins $408_1$ and $408_2$ constituting the pin group $421_1$ and return currents corresponding to the signal currents can be reduced, and thus the electromagnetic noise radiated due to the phase difference can be reduced. Similarly, the path difference, that is, phase difference between signal currents passing through the pins $408_7$ and $408_8$ constituting the pin group $421_2$ and return currents corresponding to the signal currents can be reduced, and thus the electromagnetic noise radiated due to the phase difference can be reduced. Since the radiated electromagnetic noise is reduced, the wireless communication speed of the wireless communication unit 150 is stabilized.

The ground terminal $407_1$ is adjacent to the pin $408_1$ positioned at an end of the pin group $421_1$ in the Y direction, and no other pin is present between the ground terminal $407_1$ and the pin $408_1$. That is, none of the plurality of pins $408_3$ to $408_6$ is interposed between the ground terminal $407_1$ and the pin $408_1$. The ground terminal $407_2$ is adjacent to the pin $408_8$ positioned at an end of the pin group $421_2$ in the Y direction, and no other pin is present between the ground terminal $407_2$ and the pin $408_8$. That is, none of the plurality of pins $408_3$ to $408_6$ is interposed between the ground terminal $407_2$ and the pin $408_8$. As a result of this, the path difference, that is, phase difference between signal currents and return currents can be effectively reduced, and thus the radiated electromagnetic noise can be effectively reduced.

In the first exemplary embodiment, the connector 143 includes the two pin groups $421_1$ and $421_2$ and the two ground terminals $407_1$ and $407_2$ as described above. The two pin groups $421_1$ and $421_2$ are arranged in the Y direction with the pin group 422 interposed therebetween. The two ground terminals $407_1$ and $407_2$ are arranged in the Y direction with the two pin groups $421_1$ and $421_2$ and the pin group 422 interposed therebetween. That is, the pin group 422 is disposed at the center in the Y direction, and the pin groups $421_1$ and $421_2$ are disposed at ends in the Y direction. According to such pin arrangement, the return current is evenly distributed to the ground terminals $407_1$ and $407_2$ at both sides, and thus the radiated electromagnetic noise can be effectively reduced.

The difference in the number of pins between the two pin groups $421_1$ and $421_2$ is preferably 0. As a result of this, the return current is evenly distributed to the two ground terminals $407_1$ and $407_2$, and thus the radiated electromagnetic noise can be effectively reduced. The difference in the number of pins is 0 because the number of pins of the pin group $421_1$ is an even number and the number of pins of the pin group $421_2$ is an even number. In the case where the number of pins in one of the pin groups $421_1$ and $421_2$ is an even number and the number of pins in the other of the pin groups $421_1$ and $421_2$ is an odd number, the difference in the number of pins is preferably 1. In the case where the number of pins in one of the pin groups $421_1$ and $421_2$ is an odd number and the number of pins in the other of the pin groups $421_1$ and $421_2$ is an odd number, the difference in the number of pins is preferably 0.

Although a case where four data signal lines are provided has been described as an example above, the configuration is not limited to this, and the number of data signal lines may be any number of two or more. In addition, in the case where the amount of data is large, for example, where the data is image data, the number of data signal lines is preferably 4 or more. Since there is a tendency that the path length of the return current increases as the number of data signal lines increases, the radiated electromagnetic noise can be effectively reduced by distributing the data signal lines to the two pin groups $421_1$ and $421_2$ as in the first exemplary embodiment.

The configuration of the connector 212 of the harness 201 of FIG. 3B is the same as that of the connector 211 illustrated in FIGS. 4A and 4B, and the configuration of the connector 163 of the accessory unit 160 of FIG. 2B is the same as that of the connector 143 illustrated in FIGS. 4A and 4B. Therefore, the radiated electromagnetic noise can be effectively reduced also in the connection structure of the connectors 163 and 212.

To be noted, although a ring-shaped ferrite core surrounding the cable portion 210 may be provided as a method of reducing the electromagnetic noise radiated from the cable portion 210, since the cable portion 210 includes the outer conductors 223, the ferrite core can be omitted. Since the ferrite core can be omitted, the device can be miniaturized.

Figure 6:
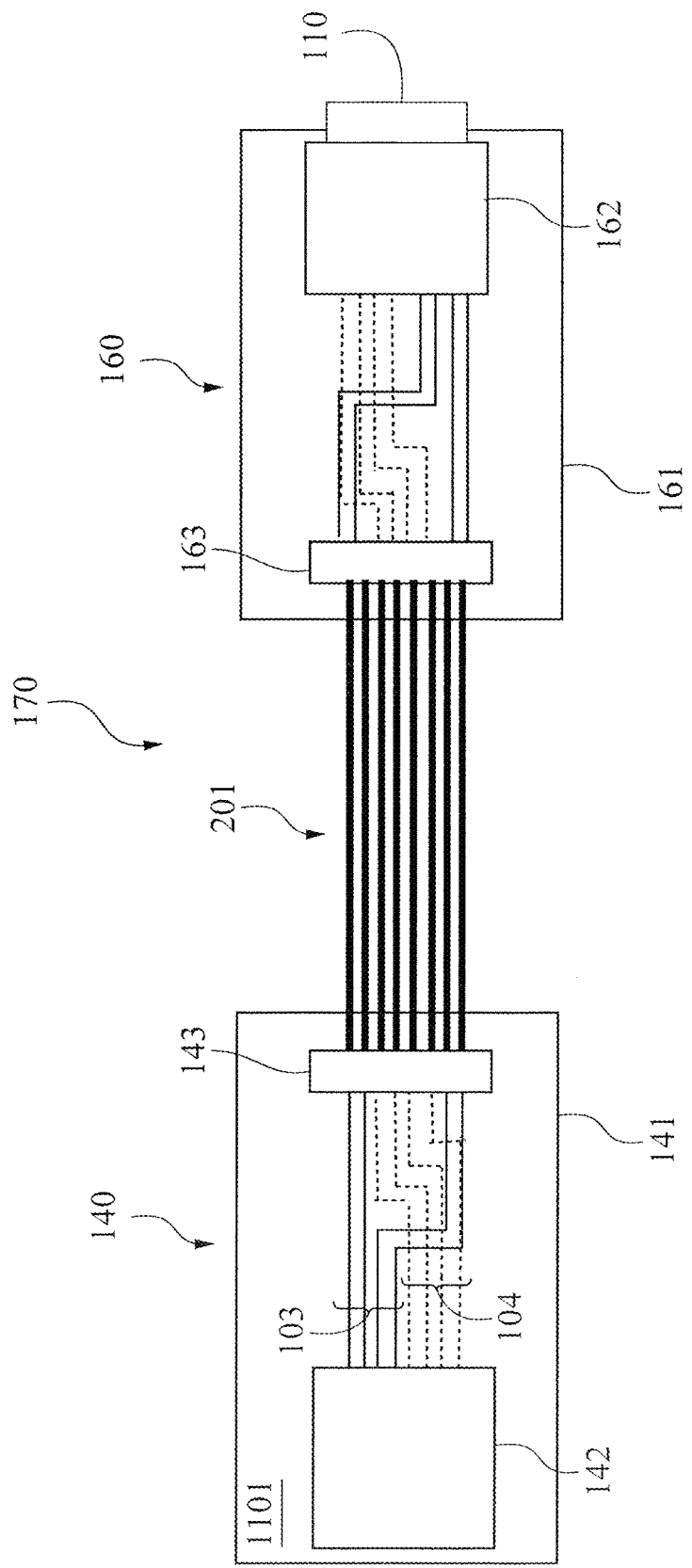
FIG. 6 is a plan view of a communication module according to the first exemplary embodiment.

FIG. 6 is a plan view of the communication module 170 according to the first exemplary embodiment. In the wiring board 141 illustrated in FIG. 6, the data signal lines 103 serving as first wiring connected to the pins $408_1$, $408_2$, $408_7$, and $408_8$ of FIG. 4A are indicated by solid lines. In addition, in the wiring board 141 illustrated in FIG. 6, the lines 104 serving as second wiring that are different from the data signal lines 103 and connected to the pins $408_3$ to $408_6$ of FIG. 4A are indicated by broken lines. The data signal lines 103 are illustrated as the conductor patterns $41_1$, $41_2$, $41_7$, and $41_8$ in FIG. 4A. The lines 104 are illustrated as the conductor patterns $41_3$ to $41_6$ in FIG. 4A. In the wiring board 141, the data signal lines 103 are disposed in the first surface layer 1101 serving as a first conductor layer on which the connector 143 is mounted. The data signal lines 103 are preferably as short as possible, and are disposed only in the first surface layer 1101 in the first exemplary embodiment. To realize the pin arrangement of the pins of the connector 143 illustrated in FIGS. 4A and 4B, the lines 104 different from the data signal lines 103 are disposed across the first surface layer 1101 and a second conductor layer different from the first surface layer 1101, for example, an inner layer or the second surface layer. The wiring structure of the wiring board 161 is the same as that of the wiring board 141. As described above, the lines 104 in the wiring board 141 may be disposed across the first surface layer 1101 and a conductor layer different from the first surface layer 1101 in accordance with the pin arrangement of the image processing IC 142.

First Modification Example

Figure 7:
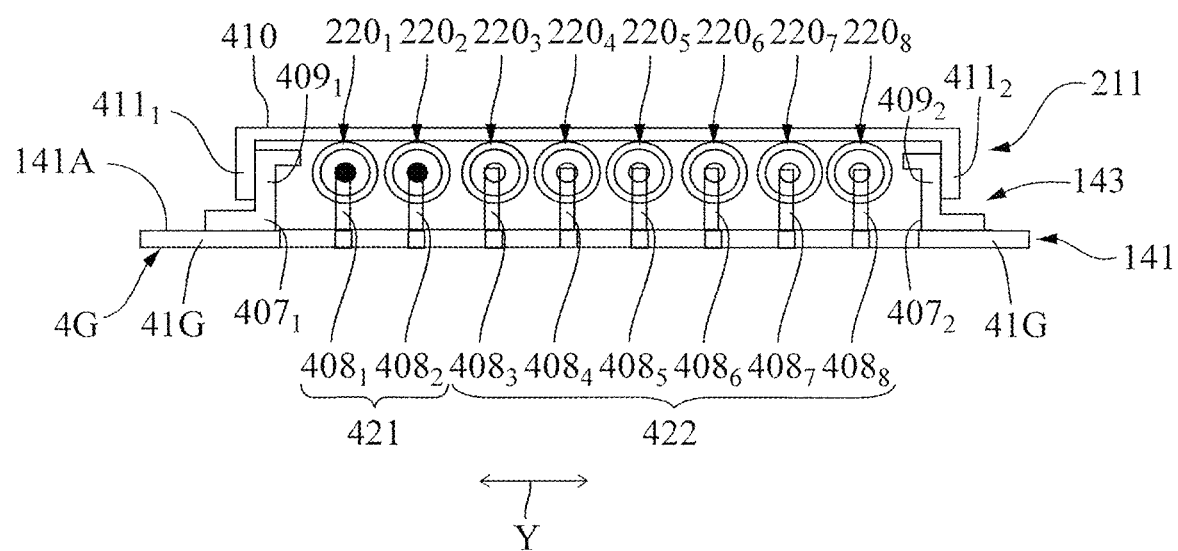
FIG. 7 is a section view of a connection structure of a connector of a harness and a connector of an image processing unit according to a first modification example.

FIG. 7 is a section view of a connection structure of a connector of a harness and a connector of an image processing unit according to a first modification example. Although the structure of the connector 143 serving as a first connector and the structure of the connector 211 serving as a second connector in the first modification example are the same as those of the first exemplary embodiment, uses of the pins are different. As illustrated in FIG. 7, the connector 143 includes the plurality of pins $408_1$ to $408_8$. The pins $408_1$ and $408_2$ constitute a plurality of high-frequency signal pins included in the plurality of pins $408_1$ to $408_8$. The pins $408_1$ and $408_2$ are first pins successively arranged in the Y direction. The plurality of pins $408_1$ and $408_2$ constitute transmission paths of data signals. The plurality of pins $408_1$ and $408_2$ constitute a pin group 421. In this case, the plurality of pins $408_3$ to $408_8$ successively arranged in the Y direction constitute a plurality of non-high-frequency signal pins included in the plurality of pins $408_1$ to $408_8$. The plurality of pins $408_3$ to $408_8$ constitute the pin group 422. Among the ground terminals $407_1$ and $407_2$, the ground terminal $407_1$ corresponds to a metal member.

As illustrated in FIG. 7, it is preferable that the pin group 421 and the ground terminal $407_1$ are adjacent to each other. That is, none of the plurality of pins $408_3$ to $408_8$ is interposed between the pin group 421 and the ground terminal $407_1$.

Second Modification Example

FIG. 8 is a plan view of a communication module of a second modification example. In the wiring board 141 illustrated in FIG. 8, the data signal lines 103 serving as first wiring connected to the pins $408_1$, $408_2$, $408_7$, and $408_8$ are indicated by solid lines. In the wiring board 141 illustrated in FIG. 8, the lines 104 serving as second wiring that are different from the data signal lines 103 and connected to the pins $408_3$ to $408_6$ are indicated by broken lines. The pin arrangement of the image processing IC 142 may be matched with the pin arrangement of the connector 143. As a result of this, the lines 104 can be disposed to be only present in the first surface layer 1101 and do not have to be disposed in a different conductor layer of the wiring board 141. Therefore, the wiring structure is simplified, and the wiring board 141 can be miniaturized.

Second Exemplary Embodiment

Figure 9A:
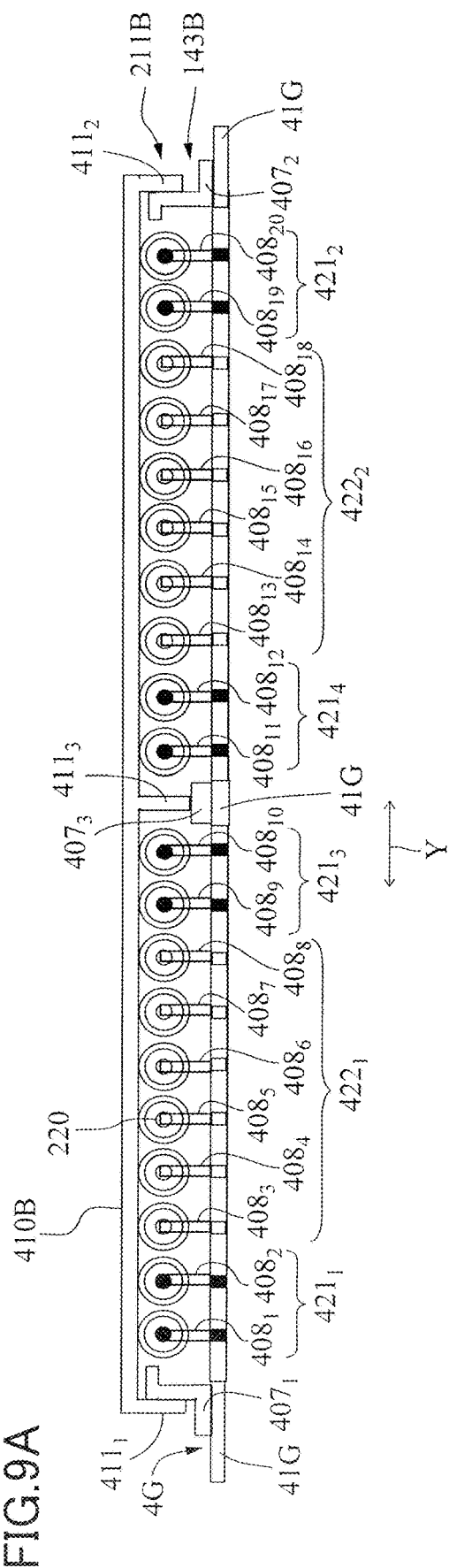
FIG. 9A is a section view of a connection structure of a connector of a harness and a connector of an image processing unit according to a second exemplary embodiment.

Pin arrangement of connectors according to a second exemplary embodiment will be described. FIG. 9A is a section view of a connection structure of a connector of a harness and a connector of an image processing unit according to the second exemplary embodiment. In the second exemplary embodiment, description of the same elements as in the first exemplary embodiment will be omitted.

A connector 143B of the image processing unit serving as a first connector includes a plurality of pins, for example, twenty pins $408_1$ to $408_{20}$ arranged in the Y direction serving as an arrangement direction. In addition, similarly to the first exemplary embodiment, the connector 143B includes the ground terminal $407_1$ serving as an example of a first metal member and the ground terminal $407_2$ serving as an example of a second metal member. Further, the connector 143B includes a ground terminal $407_3$ serving as an example of a third metal member that is bonded to the ground pattern 41G that is a part of the ground wiring 4G via solder or the like and thus electrically connected to the ground pattern 41G. The ground terminal $407_3$ is disposed between the ground terminals $407_1$ and $407_2$, at a center portion of the connector 143B in the Y direction in the second exemplary embodiment.

A cable portion of the harness is constituted by a plurality of coaxial cables, for example, twenty coaxial cables 220. A connector 211B of the harness includes a metal case 410B serving as an example of a fourth metal member. The coaxial cables 220 are supported by an unillustrated insulating member attached to the metal case 410B. Outer conductors of the twenty coaxial cables 220 are in contact with or bonded to the metal case 410B, and thus are collectively electrically connected to the metal case 410B. The metal case 410B includes the two engagement portions $411_1$ and $411_2$ that are end portions in the Y direction, and an engagement portion $411_3$ positioned at a center portion in the Y direction. When the connector 211B is attached to the connector 143B, the engagement portions $411_1$ to $411_3$ respectively come into contact with the ground terminals $407_1$ to $407_3$.

The plurality of pins $408_1$ to $408_{20}$ include a plurality of pins $408_1$, $408_2$, $408_9$, $408_{10}$, $408_{11}$, $408_{12}$, $408_{19}$, and $408_{20}$ serving as a plurality of high-frequency signal pins. In addition, the plurality of pins $408_1$ to $408_{20}$ includes pins $408_3$ to $408_8$ and $408_{13}$ to $408_{18}$ serving as a plurality of non-high-frequency signal pins.

The pins $408_1$ and $408_2$ are successively arranged in the Y direction. The pins $408_1$ and $408_2$ are each a first pin serving as a transmission path of a data signal that is a differential signal. The pins $408_1$ and $408_2$ constitute the pin group $421_1$. The pins $408_{19}$ and $408_{20}$ are successively arranged in the Y direction. The pins $408_{19}$ and $408_{20}$ are each a second pin serving as a transmission path of a data signal that is a differential signal. The pins $408_{19}$ and $408_{20}$ constitute the pin group $421_2$.

The pins $408_9$ and $408_{10}$ are successively arranged in the Y direction. The pins $408_9$ and $408_{10}$ are each a third pin serving as a transmission path of a data signal that is a differential signal. The pins $408_9$ and $408_{10}$ constitute a pin group $421_3$. The pins $408_{11}$ and $408_{12}$ are successively arranged in the Y direction. The pins $408_{11}$ and $408_{12}$ are each a fourth pin serving as a transmission path of a data signal that is a differential signal. The pins $408_{11}$ and $408_{12}$ constitute a pin group $421_4$.

The pin group $421_1$ is disposed adjacent to the ground terminal $407_1$, and the pin group $421_2$ is disposed adjacent to the ground terminal $407_2$. The two pin groups $421_3$ and $421_4$ are arranged in the Y direction with the one ground terminal $407_3$ interposed therebetween. The two pin groups $421_3$ and $421_4$ are disposed adjacent to the ground terminal $407_3$.

The pins $408_3$ to $408_8$ are successively arranged in the Y direction. The plurality of pins $408_3$ to $408_8$ constitute a pin group $422_1$. The pins $408_{13}$ to $408_{18}$ are successively arranged in the Y direction. The plurality of pins $408_{13}$ to $408_{18}$ constitute a pin group $422_2$. The pin group $422_1$ is interposed between the pin groups $421_1$ and $421_3$. In addition, the pin group $422_2$ is interposed between the pin groups $421_4$ and $421_2$.

That is, none of the plurality of pins $408_3$ to $408_8$ and $408_{13}$ to $408_{18}$ is present between the ground terminal $407_1$ and the pin group $421_1$. In addition, none of the plurality of pins $408_3$ to $408_8$ and $408_{13}$ to $408_{18}$ is present between the ground terminal $407_2$ and the pin group $421_2$. Further, none of the plurality of pins $408_3$ to $408_8$ and $408_{13}$ to $408_{18}$ is present between the ground terminal $407_3$ and the pin group $421_3$. None of the plurality of pins $408_3$ to $408_8$ and $408_{13}$ to $408_{18}$ is present between the ground terminal $407_3$ and the pin group $421_4$.

As described above, in the case where the engagement portion $411_3$ is present at a center portion of the metal case 410B in the Y direction, the pin groups $421_3$ and $421_4$ may be disposed adjacent to the ground terminal $407_3$ that engages with the engagement portion $411_3$. By disposing the pin groups $421_3$ and $421_4$ in the vicinity of the ground terminal $407_3$, the path difference, that is, the phase difference between signal currents that pass through the pins constituting the pin groups $421_3$ and $421_4$ and return currents corresponding to the signal currents can be reduced. Therefore, the electromagnetic noise radiated due to the phase difference can be reduced. Since the radiated electromagnetic noise is reduced, the wireless communication speed of the wireless communication unit 150 of FIG. 2B is stabilized.

The difference in the number of pins between the two pin groups $421_3$ and $421_4$ is preferably 0. As a result of this, the pins of the two pin groups $421_3$ and $421_4$ can be as close as possible to the ground terminal $407_3$, and thus the radiated electromagnetic noise can be effectively reduced. The difference in the number of pins is 0 because the number of pins of the pin group $421_3$ is an even number and the number of pins of the pin group $421_4$ is an even number. In the case where the number of pins in one of the pin groups $421_3$ and $421_4$ is an even number and the number of pins in the other of the pin groups $421_3$ and $421_4$ is an odd number, the difference in the number of pins is preferably 1. In the case where the number of pins in one of the pin groups $421_3$ and $421_4$ is an odd number and the number of pins in the other of the pin groups $421_3$ and $421_4$ is an odd number, the difference in the number of pins is preferably 0.

Third Modification Example

Figure 9B:
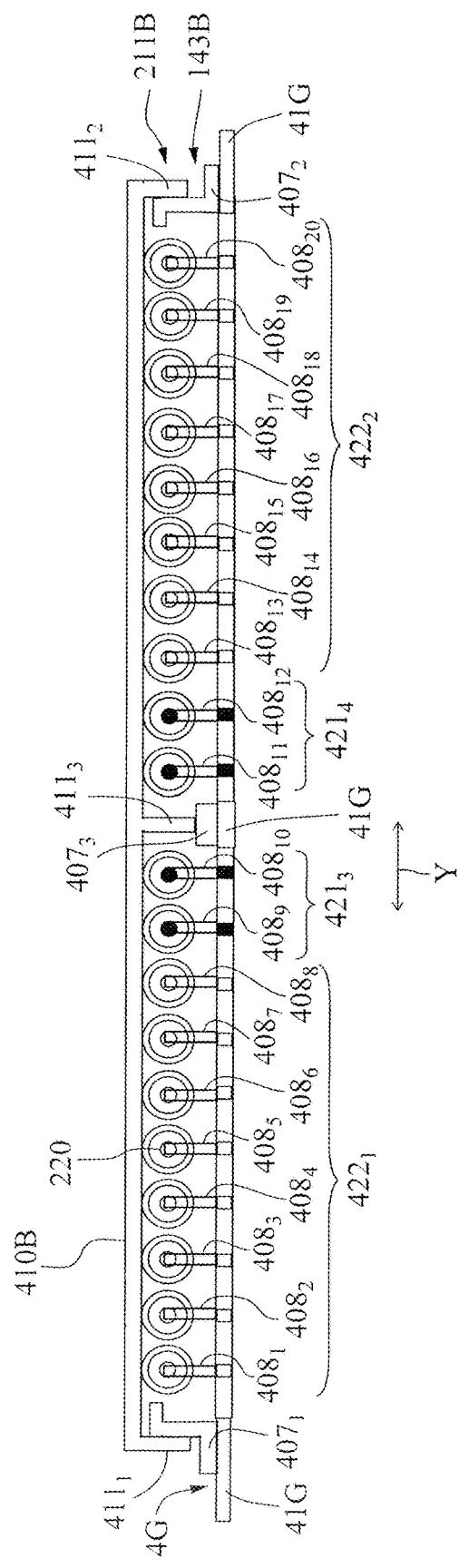
FIG. 9B is a section view of a connection structure between a connector of a harness and a connector of an image processing unit according to a third modification example.

FIG. 9B is a section view of a connection structure of a connector of a harness and a connector of an image processing unit according to a third modification example. Although the structure of the connector 143B serving as a first connector and the structure of the connector 211B serving as a second connector in the third modification example are the same as those of the second exemplary embodiment, uses of the pins are different. As illustrated in FIG. 9B, the connector 143B includes the plurality of pins $408_1$ to $408_{20}$. The pins $408_9$ to $408_{12}$ constitute a plurality of high-frequency signal pins included in the plurality of pins $408_1$ to $408_{20}$. The other plurality of pins $408_1$ to $408_8$ and $408_{13}$ to $408_{20}$ are a plurality of non-high-frequency signal pins included in the plurality of pins $408_1$ to $408_{20}$. Among the ground terminals $407_1$, $407_2$, and $407_3$, the ground terminal $407_3$ corresponds to a metal member adjacent to the high-frequency signal pins.

The pins $408_9$ and $408_{10}$ are successively arranged in the Y direction. The plurality of pins $408_9$ and $408_{10}$ constitute the pin group $421_3$. The pins $408_{11}$ and $408_{12}$ are successively arranged in the Y direction. The plurality of pins $408_{11}$ and $408_{12}$ constitute the pin group $421_4$. The pin group $421_4$ is disposed on a side opposite to the pin group $421_3$ with the ground terminal $407_3$ interposed therebetween. That is, the ground terminal $407_3$ is interposed between the pin groups $421_3$ and $421_4$.

The pins $408_1$ to $408_8$ are successively arranged in the Y direction. The plurality of pins $408_1$ to $408_8$ constitute the pin group $422_1$. The pins $408_{13}$ to $408_{20}$ are successively arranged in the Y direction. The plurality of pins $408_{13}$ to $408_{20}$ constitute the pin group $422_2$. The pin group $422_2$ is disposed on a side opposite to the pin group $422_1$ with the ground terminal $407_3$ interposed therebetween.

The ground terminal $407_3$ is disposed adjacent to the pin groups $421_3$ and $421_4$. That is, no other pin, that is, none of the plurality of pins $408_1$ to $408_8$ and $408_{13}$ to $408_{20}$ is interposed between the ground terminal $407_3$ and the pin group $421_3$ and between the ground terminal $407_3$ and the pin group $421_4$. In this case, pins included in the pin groups $421_3$ and $421_4$ serve as first pins.

Also in the third modification example, the engagement portion $411_3$ is present at a center portion of the metal case 410B in the Y direction, and the pin groups $421_3$ and $421_4$ are disposed adjacent to the ground terminal $407_3$ that engages with the engagement portion $411_3$. By disposing the pin groups $421_3$ and $421_4$ in the vicinity of the ground terminal $407_3$, the path difference, that is, the phase difference between signal currents that pass through the pins constituting the pin groups $421_3$ and $421_4$ and return currents corresponding to the signal currents can be reduced. Therefore, the electromagnetic noise radiated due to the phase difference can be reduced. Since the radiated electromagnetic noise is reduced, the wireless communication speed of the wireless communication unit 150 of FIG. 2B is stabilized.

The difference in the number of pins between the two pin groups $421_3$ and $421_4$ is preferably 0. As a result of this, the pins of the two pin groups $421_3$ and $421_4$ can be as close as possible to the ground terminal $407_3$, and thus the radiated electromagnetic noise can be effectively reduced. The difference in the number of pins is 0 because the number of pins of the pin group $421_3$ is an even number and the number of pins of the pin group $421_4$ is an even number. In the case where the number of pins in one of the pin groups $421_3$ and $421_4$ is an even number and the number of pins in the other of the pin groups $421_3$ and $421_4$ is an odd number, the difference in the number of pins is preferably 1. In the case where the number of pins in one of the pin groups $421_3$ and $421_4$ is an odd number and the number of pins in the other of the pin groups $421_3$ and $421_4$ is an odd number, the difference in the number of pins is preferably 0.

To be noted, although a case where the pin groups $421_3$ and $421_4$ are present on both sides of the ground terminal $407_3$ in the Y direction as illustrated in FIGS. 9A and 9B have been described in the second exemplary embodiment and the third modification example, the configuration is not limited to this. Either one of the pin groups $421_3$ and $421_4$ may be omitted.

Third Exemplary Embodiment

Figure 10:
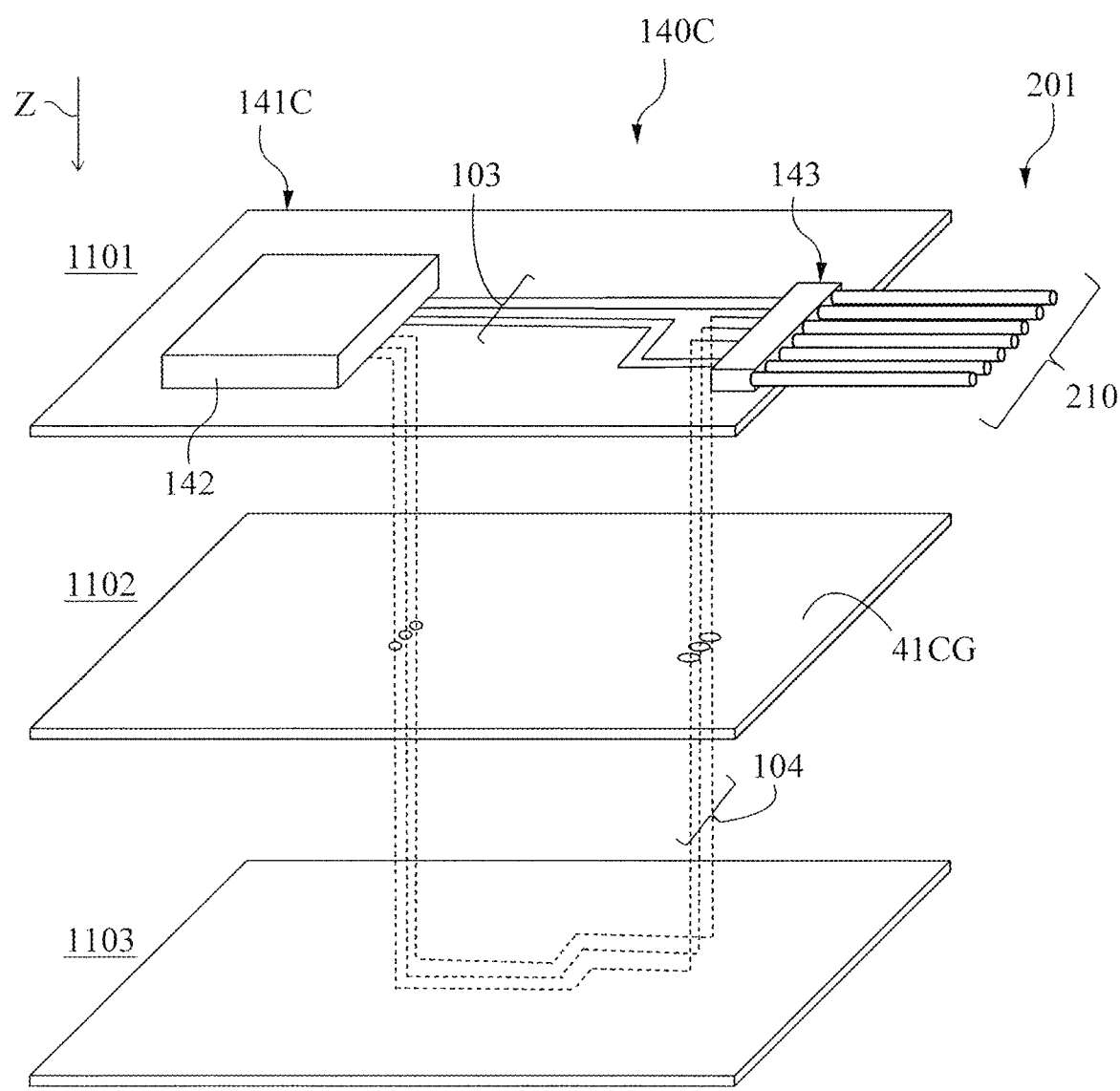
FIG. 10 is an explanatory diagram of an image processing unit in a communication module according to a third exemplary embodiment.

A structure of a communication module according to a third exemplary embodiment will be described. In the third exemplary embodiment, the configuration of the wiring board of the image processing unit in the communication module is different from the first and second exemplary embodiments. FIG. 10 is an explanatory diagram of an image processing unit 140C in the communication module according to the third exemplary embodiment. The image processing unit 140C includes a wiring board 141C, and similarly to the first exemplary embodiment, the image processing IC 142 and the connector 143. The wiring board 141C is a printed wiring board. The image processing IC 142 and the connector 143 are provided on the wiring board 141C.

The wiring board 141C is a triple layer substrate in the third exemplary embodiment. The wiring board 141C includes the first surface layer 1101, a second surface layer 1103 opposite to the first surface layer 1101, and an inner layer 1102. The first surface layer 1101 serves as a first conductor layer. The second surface layer 1103 serves as a second conductor layer different from the first conductor layer. The inner layer 1102 serves as a third conductor layer between the first conductor layer and the second conductor layer. These three conductor layers are arranged in the Z direction in the order of the first surface layer 1101, the inner layer 1102, and the second surface layer 1103. The image processing IC 142 and the connector 143 are mounted on the first surface layer 1101. An unillustrated insulating layer is provided between the first surface layer 1101 and the inner layer 1102, and an unillustrated insulating layer is provided between the inner layer 1102 and the second surface layer 1103. To be noted, in the case where the wiring board 141C is a substrate of four or more layers, the second conductor layer may be an inner layer.

The wiring board 141C includes a plurality of data signal lines 103 serving as first wiring. In addition, the wiring board 141C includes a plurality of lines 104 serving as second wiring different from the data signal lines 103. The data signal lines 103 are illustrated as the conductor patterns $41_1$, $41_2$, $41_7$, and $41_8$ in FIG. 4A. The lines 104 are illustrated as the conductor patterns $41_3$ to $41_6$ in FIG. 4A. The data signal lines 103 are disposed only in the first surface layer 1101, and the lines 104 are disposed across the first surface layer 1101 and the second surface layer 1103.

In the first exemplary embodiment described above, the memory card 110 is attached to the memory connector 162 of the accessory unit 160, for example, as illustrated in FIG.

6. When a high-speed signal is transmitted to the memory card 110, a control line is terminated in the wiring board 161.

Meanwhile, there is a case where an electronic component serving as an accessory of a camera, such as an electronic view finder that performs high-speed transmission of a signal or a stroboscope that does not perform high-speed transmission, is provided on the wiring board 161. In the case where an electronic view finder is electrically connected to the connector 163, a control line and a power supply line of the stroboscope are not electrically connected to the connector 163, and are therefore floating lines whose one ends are not terminated. The floating lines have high antenna efficiency.

The lines 104 illustrated in FIG. 10 include the control line and power supply line of the stroboscope. In the third exemplary embodiment, the wiring board 141C includes a ground pattern 41CG that is a part of the ground wiring and disposed in the inner layer 1102 between the first surface layer 1101 and the second surface layer 1103. The ground pattern 41CG is, for example, a solid pattern, and overlaps with a half or more, preferably 90% or more of the data signal lines 103 as viewed in the Z direction perpendicular to the main surface of the wiring board 141C, that is, in a plan view. In the third exemplary embodiments, the ground pattern 41CG overlaps with the entirety of the data signal lines 103. As a result of the ground pattern 41CG, electromagnetic coupling, that is, crosstalk between the control line and power supply line of the stroboscope and the data signal lines 103 can be prevented. In addition, as a result of the same structure of connectors as in the first exemplary embodiment, the level of noises received by the antenna can be lowered.

EXAMPLES

Figure 11:
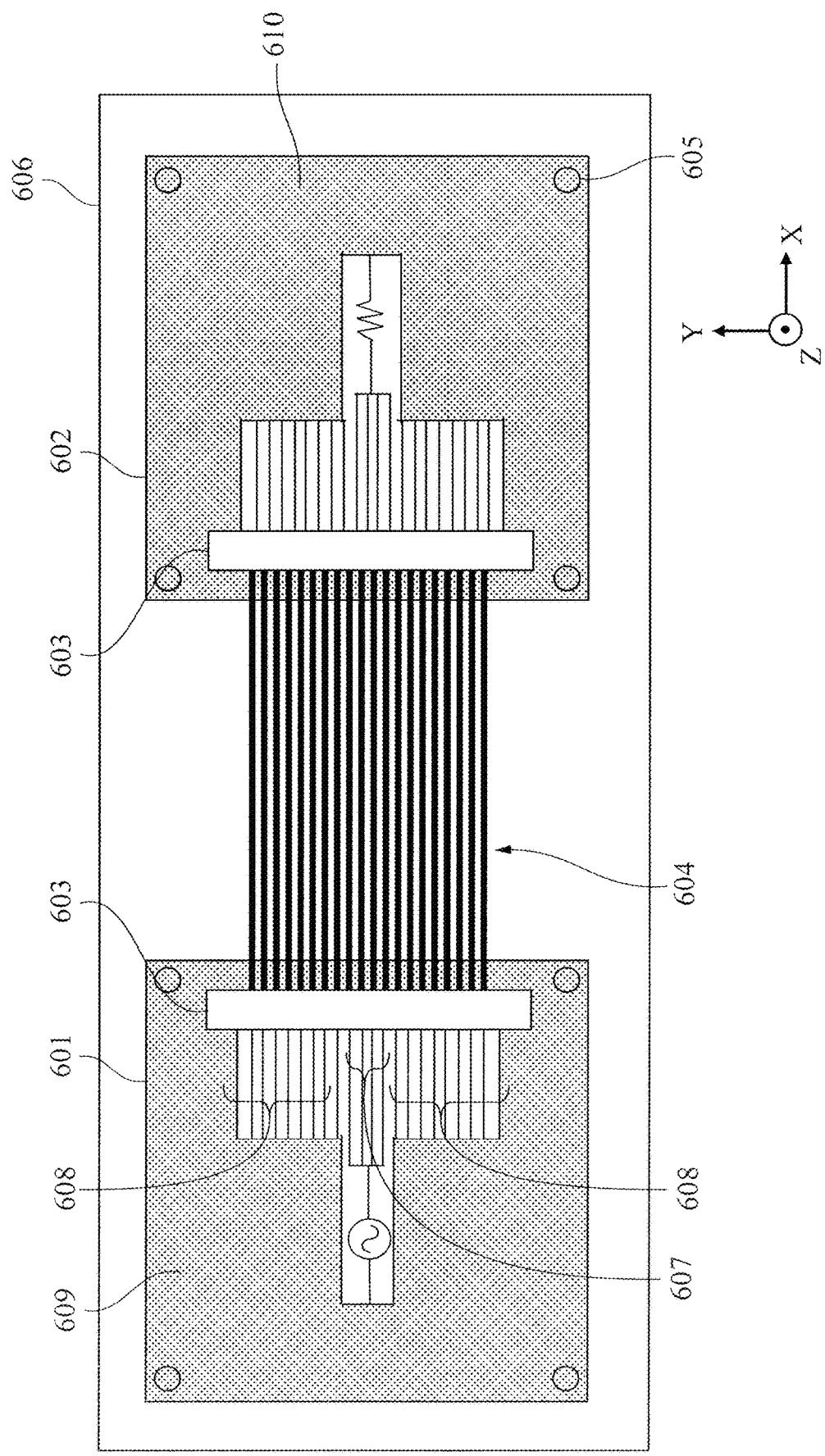
FIG. 11 is a diagram illustrating a simulation model of a communication module according to Examples.

As Examples, three-dimensional electromagnetic field simulation was performed by using a simulation model of a communication module. For calculation, a three-dimensional electromagnetic field simulator MW-STUDIO available from CST was used. FIG. 11 is a diagram illustrating a simulation model of a communication module of Examples. In the model of FIG. 11, a printed wiring board 601 that transmits a data signal and a printed wiring board 602 that receives the data signal are interconnected via two connector portions 603 and twenty shielded cables 604. The connector portions 603 are each constituted by a first connector and a second connector. The printed wiring boards 601 and 602 are each electrically connected to a metal plate 606 via metal spacers 605 each having a columnar shape of a height of 6.6 mm and a diameter of 4 mm and disposed at four corners thereof. The wiring boards 601 and 602 are provided with four data signal lines 607 disposed at center portions of the connectors and lines 608 that are different from the data signal lines 607, corresponding to a control line, a power supply line, and a ground line, and disposed on both sides of the data signal lines 607. To be noted, the lines 608 are connected to a ground pattern 609 in the printed wiring board 601, and are connected to a ground pattern 610 in the printed wiring board 602. In the simulation, a wave source was set between the data signal lines 607 of the printed wiring board 601 and the ground pattern 609, and power was supplied to the data signal lines 607 assuming a common mode caused by phase shift. The data signal lines 607 of the printed wiring board 602 were terminated by disposing a resistor of 50Ω between the data signal lines 607 and the ground pattern 610.

Dimensions of each component in FIG. 11 will be described. The printed wiring board 601 and 602 were each set as a four-layer substrate having a size of 55 mm in the X direction×70 mm in the Y direction. It was assumed that the data signal lines 607 were disposed in the first layer of conductor layers, that is, the surface layer, and solid ground patterns were disposed in the second, third, and fourth layers of the conductor layers. The thicknesses of the first and fourth conductor layers were set to 0.1 mm, the thicknesses of the second and third conductor layers were set to 0.035 mm, and copper was set as the material of the conductor layers. The thickness of an insulating layer between the first and second conductor layers was set to 0.1 mm, the thickness of tan insulating layer between the second and third conductor layers was set to 1.13 mm, the thickness of an insulating layer between the third and fourth conductor layers was set to 0.1 mm, and FR4 was set as the material of the insulating layers. The size of the metal plate 606 was set to 242 mm in the X direction×102 mm in the Y direction, and copper was set as the material thereof. The length of the shielded cables 604 was set to 110 mm.

Figure 12A:
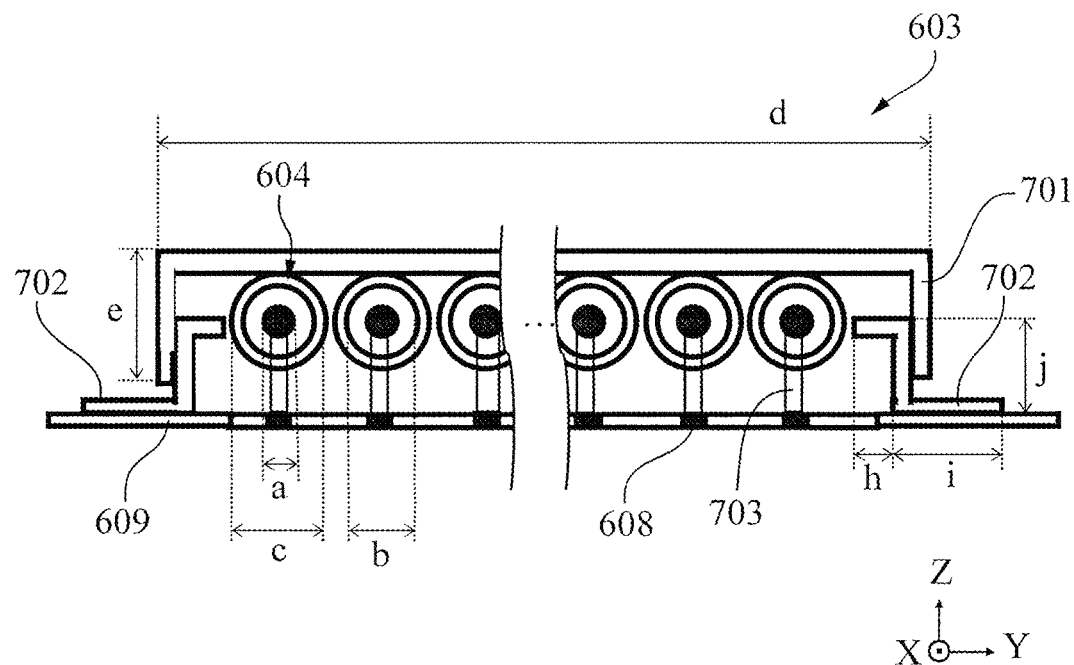
FIG. 12A is a section view of a connector portion according to Examples.
Figure 12B:
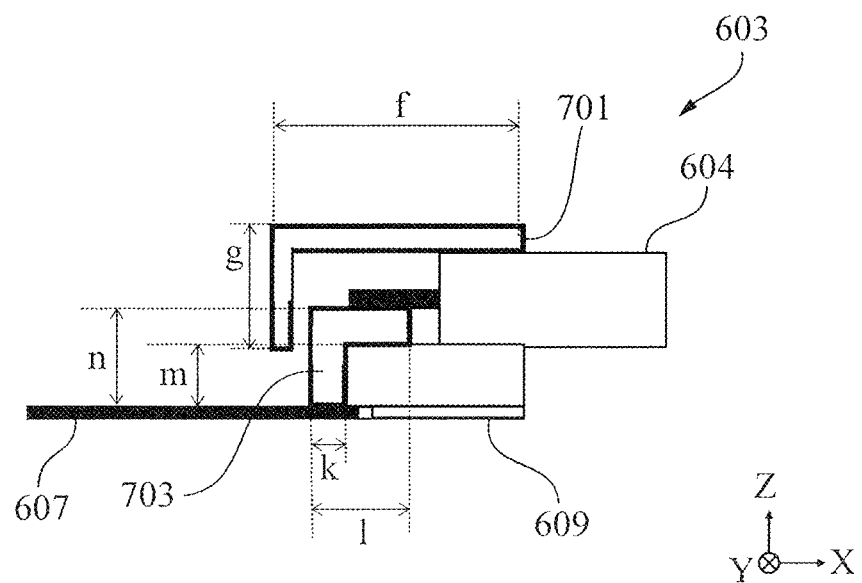
FIG. 12B is another section view of the connector portion according to Examples.

FIGS. 12A and 12B are section views of each of the connector portions 603 of Examples. FIG. 12A is a section view of the connector portion 603 taken along a Y-Z plane at the center of the connector portion 603. FIG. 12B is a section view of the connector portion 603 taken along an X-Z plane at the center of the connector portion 603. The diameter a of the core wire of each shielded cable 604 was set to 0.09 mm, and copper was set as the material of the core wire. The diameter b of an inner resin material of each shielded cable 604 was set to 0.28 mm, and Teflon (registered trademark) was set as the inner resin material. The diameter c of the outer conductor of each shielded cable 604 was set to 0.31 mm, and copper was set as the material of the outer conductor. The interval between two adjacent shielded cables 604 was set to 0.09 mm. A metal cover 701 was formed by bending a copper plate of a thickness of 1 mm into a U shape in section view taken along the Z-Y plane and an L shape in section view taken along the X-Z plane. As viewed in the Z-Y plane, a dimension d of the metal cover 701 in the Y direction was set to 10.74 mm, and a dimension e of the metal cover 701 in the Z direction was set to 1.34 mm. As viewed in the X-Z plane, a dimension f of the metal cover 701 in the X direction was set to 2.53 mm, and a dimension g of the metal cover 701 in the Z direction was set to 1.45 mm. Ground terminals 702 were each formed by bending a copper plate of a thickness of 1 mm into a Z shape in section view taken along the Y-Z plane. In the Y direction, a dimension h of each ground terminal 702 was set to 0.5 mm, and a dimension i of each ground terminal 702 was set to 1.2 mm. A dimension j of each ground terminal 702 in the Z direction was set to 1.3 mm, and a dimension of each ground terminal 702 in the X direction was set to 1 mm. In the X direction, a dimension k of each pin 703 was set to 1 mm, and a dimension l of each pin 703 was set to 0.86 mm. In the Z direction, a dimension m of each pin 703 was set to 1 mm, and a dimension n of each pin 703 was set to 1.28 mm. A dimension of each pin 703 in the Y direction was set to 1 mm. The line width of each of the data signal lines 607 and the lines 608 was set to 1 mm, and the distance from each of the connector portions 603 to the wave source or the termination resistance was set to 4 mm.

Figure 13A:
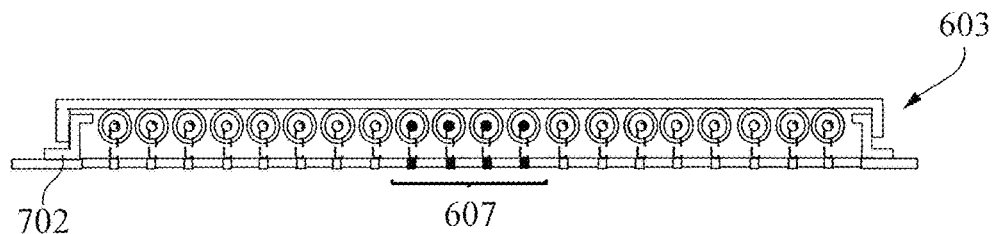
FIG. 13A is a section view of a connector portion illustrating a wiring structure of a simulation model obtained by simulation in Examples.
Figure 13B:
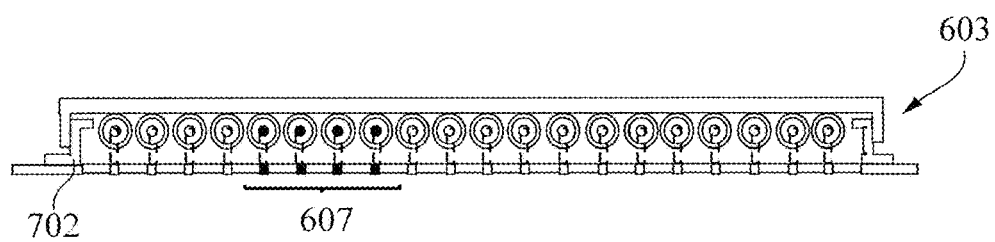
FIG. 13B is a section view of a connector portion illustrating a wiring structure of a simulation model obtained by simulation in Examples.
Figure 13C:
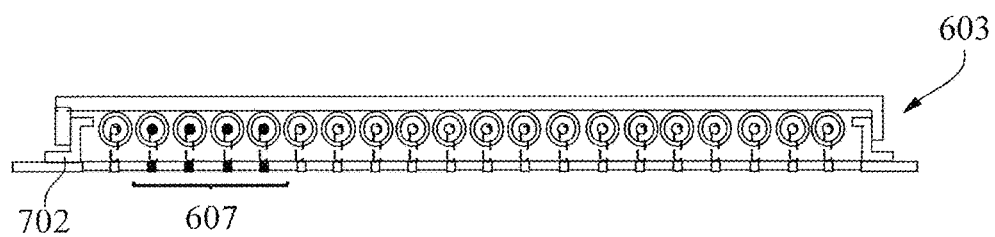
FIG. 13C is a section view of a connector portion illustrating a wiring structure of a simulation model obtained by simulation in Examples.

FIGS. 13A to 13E are section views of a connector portion illustrating wiring structures of simulation models simulated in Examples. FIGS. 13A to 13C illustrate cases where four pins connected to the four data signal lines 607 are disposed adjacent to each other.

FIG. 13A illustrates a case where, among sixteen pins connected to lines different from the data signal lines 607, eight pins are disposed on the left side of FIG. 13A and the other eight pins are disposed on the right side of FIG. 13A. FIG. 13B illustrates a case where, among sixteen pins connected to lines different from the data signal lines 607, four pins are disposed on the left side of FIG. 13B and the other twelve pins are disposed on the right side of FIG. 13B. FIG. 13C illustrates a case where four pins connected to the four data signal lines 607 are disposed adjacent to each other. FIG. 13C illustrates a case where, among sixteen pins connected to lines different from the data signal lines 607, one pin is disposed on the left side of FIG. 13C and the other fifteen pins are disposed on the right side of FIG. 13C. That is, only one of the pins connected to lines different from the data signal lines 607 is interposed between the four pins connected to the four data signal lines 607 and one of the ground terminals 702. This pin is connected to the ground wiring.

Figure 13D:
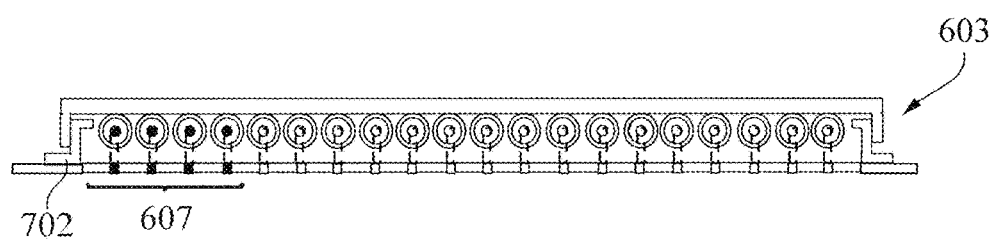
FIG. 13D is a section view of a connector portion illustrating a wiring structure of a simulation model obtained by simulation in Examples.
Figure 13E:
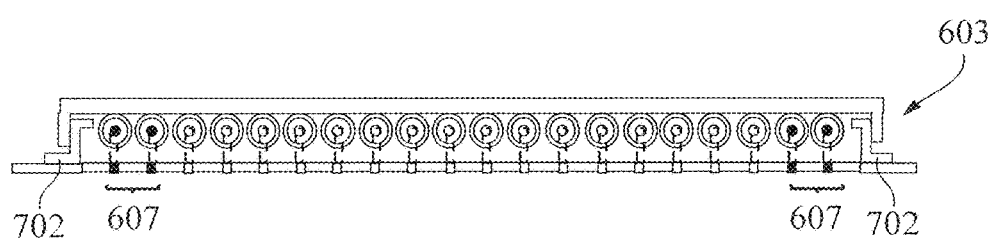
FIG. 13E is a section view of a connector portion illustrating a wiring structure of a simulation model obtained by simulation in Examples.

FIG. 13D illustrates a case where the sixteen pins connected to lines different from the data signal lines 607 are disposed on the right side in FIG. 13D. That is, one of the four pins connected to the four data signal lines 607 is disposed adjacent to one of the ground terminals 702. FIG. 13E illustrates a case where two pin groups each including two pins connected to two of the data signal lines 607 and disposed adjacent to each other are disposed and sixteen pins connected to lines different from the data signal lines 607 are disposed between the two pin groups. Therefore, one of the two pin groups is disposed adjacent to one of the two ground terminals 702 and the other of the two pin groups is disposed adjacent to the other of the two ground terminals 702.

The model illustrated in FIG. 13A will be referred to as "Model 1", the model illustrated in FIG. 13B will be referred to as "Model 2", the model illustrated in FIG. 13C will be referred to as "Model 3", the model illustrated in FIG. 13D will be referred to as "Model 4", and the model illustrated in FIG. 13E will be referred to as "Model 5". To measure an amount of noise leaked from the connector portions 603 and transmitted to the outer conductors of the cables, the magnetic field intensity at a height of 6 mm above the cables at the center of the cables was calculated. The observation frequency was set to 2.432 GHz band corresponding to the fifth channel used in a frequency band of WiFi (registered trademark) communication. The results of the calculation are shown in Table 1.

TABLE 1

| Model | Magnetic field intensity [dBA/m] |
| --- | --- |
| 1 | 10.17 |
| 2 | 9.52 |
| 3 | 8.57 |
| 4 | 7.61 |
| 5 | 6.11 |

Model 1 serves as Comparative Example 1. Model 2 serves as Comparative Example 2. Model 3 serves as Comparative Example 3. Model 4 serves as Example 1. Model 5 serves as Example 2. In Table 1, comparing Models 1, 2, 3, and 4, it can be seen that the amount of leakage of electromagnetic noise is reduced more when the data signal lines 607 are closer to the ground terminals 702. It can be seen that the amount of leakage of electromagnetic noise can be reduced more in Model 4 than in Models 1 to 3. It can be seen that the amount of leakage of electromagnetic noise is the smallest in Model 5 among Models 1 to 5.

To be noted, although the simulation was performed assuming 2.432 GHz corresponding to the fifth channel used in a frequency band of WiFi (registered trademark) communication in the present examples, the frequency band is not limited to this. In WiFi (registered trademark), the present invention is applicable to other frequency bands such as bands from 2.412 GHz to 2.472 GHz, bands from 5.18 GHz to 5.32 GHz, and bands from 5.5 GHz to 5.7 GHz. Further, the communication system of the wireless communication unit serving as a victim circuit is not limited to WiFi (registered trademark), and may be a different communication system such as a public wireless communication system like long term evolution: LTE or 5G, or Bluetooth (registered trademark). In addition, although a case where simulation was performed has been described in the present examples, the electromagnetic noise may be actually measured. In this case, the electromagnetic noise in a communication frequency band can be analyzed by a spectrum analyzer by disposing a commercially available magnetic field probe right above the center of the cables or right above a connector portion.

To be noted, the present invention is not limited to the exemplary embodiments described above, and can be modified in many ways within the technical concept of the present invention. In addition, the effects described in the exemplary embodiments are merely enumeration of the most preferable effects that can be achieved by the present invention, and the effects of the present invention are not limited to those described in the exemplary embodiments.

Although a structure of the connector 143 of the image processing unit 140 illustrated in FIG. 2A and a structure of the connector 163 of the accessory unit 160 illustrated in FIG. 2B have been described in the exemplary embodiments described above, these structures may be applied to other connectors. For example, these structures may be applied to the connector 144 illustrated in FIG. 2A and the connector 133 illustrated in FIG. 2B. In addition, these structures may be applied to the connectors 154 and 145 connected to the wireless communication IC 152 in a wired manner.

Although an image pickup apparatus serving as an example of an electronic device has been described in the exemplary embodiments described above, the electronic device is not limited to this, and the present invention can be applied to, for example, an image forming apparatus such as a printer as the electronic device.

Although a case where the electronic device includes a wireless communication unit serving as a victim circuit has been described in the exemplary embodiments described above, the configuration is not limited to this. Also in the case where the electronic device does not include the wireless communication unit, since the electromagnetic noise leaked to the outside of the electronic device can be reduced, interference of the electromagnetic noise with another electronic device can be suppressed. In addition, the victim circuit is not limited to a wireless communication unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-220770, filed Nov. 26, 2018, and Japanese Patent Application No. 2019-187665, filed Oct. 11, 2019, which are hereby incorporated by reference herein in their entirety.

What is claimed is:

1. A communication module comprising:
a wiring board comprising ground wiring;
an electronic component provided on the wiring board; and
a first connector provided on the wiring board and electrically connected to the electronic component via the wiring board,
wherein the first connector comprises:
a metal member electrically connected to the ground wiring; and
a plurality of pins arranged in an arrangement direction and comprising a plurality of high-frequency signal pins used for transmission of a high-frequency signal and a plurality of non-high-frequency signal pins for a use different from the transmission of the high-frequency signal,
wherein the plurality of high-frequency signal pins comprise a plurality of first pins successively arranged in the arrangement direction, and
wherein none of the plurality of non-high-frequency signal pins is interposed between the plurality of first pins and the metal member.

2. The communication module according to claim 1,
wherein the first connector comprises a first metal member and a second metal member arranged in the arrangement direction with an interval therebetween, and
wherein the metal member is a third metal member disposed between the first metal member and the second metal member.

3. The communication module according to claim 1, wherein the electronic component is a memory connector to and from which a memory is attachable and detachable.

4. The communication module according to claim 1, further comprising a second connector attachable to and detachable from the first connector,
wherein the second connector comprises a fourth metal member that comes into contact with the metal member in a case where the second connector is attached to the first connector.

5. The communication module according to claim 4, further comprising a plurality of coaxial cables attached to the second connector,
wherein the plurality of coaxial cables each comprise a core wire and an outer conductor, and
wherein a plurality of outer conductors each of which is the outer conductor are electrically connected to the fourth metal member.

6. The communication module according to claim 1, wherein the wiring board comprises a plurality of first lines that are disposed in a first conductor layer and electrically interconnect the electronic component and the plurality of high-frequency signal pins.

7. The communication module according to claim 6,
wherein the wiring board comprises a plurality of second lines that are disposed across the first conductor layer and a second conductor layer different from the first conductor layer and that electrically interconnect the electronic component and the plurality of non-high-frequency signal pins, and
wherein the ground wiring comprises a ground pattern disposed in a third conductor layer between the first conductor layer and the second conductor layer.

8. The communication module according to claim 1, wherein the electronic component is a semiconductor device.

9. The communication module according to claim 8, wherein the semiconductor device is an image processing integrated circuit.

10. The communication module according to claim 1, wherein the high-frequency signal is a digital signal of a communication speed of 100 Mbps or higher.

11. The communication module according to claim 10, wherein the digital signal is a differential signal.

12. The communication module according to claim 10, wherein the digital signal is a data signal.

13. The communication module according to claim 1,
wherein the metal member is a first metal member,
wherein the first connector comprises a second metal member disposed with an interval from the first metal member in the arrangement direction and electrically connected to the ground wiring,
wherein the plurality of high-frequency signal pins comprise a plurality of second pins successively arranged in the arrangement direction, and
wherein none of the plurality of non-high-frequency signal pins is interposed between the plurality of second pins and the second metal member.

14. The communication module according to claim 13, wherein a difference between a number of the plurality of first pins and a number of the plurality of second pins is zero or one.

15. The communication module according to claim 13,
wherein the first connector comprises a third metal member disposed between the first metal member and the second metal member,
wherein the plurality of high-frequency signal pins comprise a plurality of third pins successively arranged in the arrangement direction, and
wherein none of the plurality of non-high-frequency signal pins is interposed between the plurality of third pins and the third metal member.

16. The communication module according to claim 15,
wherein the plurality of high-frequency signal pins comprise a plurality of fourth pins that are disposed on an opposite side to the plurality of third pins with the third metal member interposed therebetween and that are successively arranged in the arrangement direction, and
wherein none of the plurality of non-high-frequency signal pins is interposed between the plurality of fourth pins and the third metal member.

17. The communication module according to claim 16, wherein a difference between a number of the plurality of third pins and a number of the plurality of fourth pins is zero or one.

18. An electronic device comprising:
a casing;
a wireless communication unit disposed inside the casing; and
a communication module disposed inside the casing,
wherein the communication module comprises:
a wiring board comprising ground wiring;
an electronic component provided on the wiring board; and
a first connector provided on the wiring board and electrically connected to the electronic component via the wiring board,
wherein the first connector comprises:
a metal member electrically connected to the ground wiring; and a plurality of pins arranged in an arrangement direction and comprising a plurality of high-frequency signal pins used for transmission of a high-frequency signal and a plurality of non-high-frequency signal pins for a use different from the transmission of the high-frequency signal, wherein the plurality of high-frequency signal pins comprise a plurality of first pins successively arranged in the arrangement direction, and wherein none of the plurality of non-high-frequency signal pins is interposed between the plurality of first pins and the metal member.

19. An image pickup apparatus comprising:

a casing;

a wireless communication unit disposed inside the casing;

an image pickup element disposed inside the casing; and a communication module disposed inside the casing, wherein the communication module comprises:

a wiring board comprising ground wiring;

an electronic component provided on the wiring board; and a first connector provided on the wiring board and electrically connected to the electronic component via the wiring board, wherein the first connector comprises:

a metal member electrically connected to the ground wiring; and a plurality of pins arranged in an arrangement direction and comprising a plurality of high-frequency signal pins used for transmission of a high-frequency signal and a plurality of non-high-frequency signal pins for a use different from the transmission of the high-frequency signal, wherein the plurality of high-frequency signal pins comprise a plurality of first pins successively arranged in the arrangement direction, and wherein none of the plurality of non-high-frequency signal pins is interposed between the plurality of first pins and the metal member.

\* \* \* \* \*